US010789411B2

(12) United States Patent
Srinivasan et al.

(10) Patent No.: US 10,789,411 B2
(45) Date of Patent: Sep. 29, 2020

(54) UTILIZING A GENETIC FRAMEWORK TO GENERATE ENHANCED DIGITAL LAYOUTS OF DIGITAL FRAGMENTS FOR CROSS-PLATFORM DISTRIBUTION TO CLIENT DEVICES

(71) Applicant: Adobe Inc., San Jose, CA (US)

(72) Inventors: Balaji Vasan Srinivasan, Bangalore (IN); Vishwa Vinay, Bangalore (IN); Niyati Chhaya, Pune (IN); Cedric Huesler, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 44 days.

(21) Appl. No.: 16/025,140

(22) Filed: Jul. 2, 2018

(65) Prior Publication Data

US 2020/0004804 A1    Jan. 2, 2020

(51) Int. Cl.
    *G06F 40/106*    (2020.01)
    *G06F 40/186*    (2020.01)
    *G06F 40/14*     (2020.01)

(52) U.S. Cl.
    CPC .......... *G06F 40/106* (2020.01); *G06F 40/186* (2020.01); *G06F 40/14* (2020.01)

(58) Field of Classification Search
    CPC ... G06F 17/212; G06F 17/248; G06F 17/2247
    USPC ............................... 715/234, 243, 246, 247
    See application file for complete search history.

(56) References Cited

U.S. PATENT DOCUMENTS

| 6,393,479 | B1* | 5/2002 | Glommen | G06F 11/3495 709/219 |
| 8,463,734 | B2* | 6/2013 | Von Sydow | G06N 7/005 706/55 |
| 9,386,109 | B1* | 7/2016 | Kent | H04L 67/22 |
| 10,078,626 | B1* | 9/2018 | Voskamp | G06F 17/2247 |
| 2003/0130982 | A1* | 7/2003 | Kasriel | G06Q 30/02 |
| 2007/0106641 | A1* | 5/2007 | Chi | G06F 16/9558 |
| 2007/0106758 | A1* | 5/2007 | Chi | G06F 16/9558 709/219 |
| 2009/0010536 | A1* | 1/2009 | Mizukami | H04N 1/603 382/167 |
| 2009/0204559 | A1* | 8/2009 | Bax | G06N 20/00 706/25 |

(Continued)

OTHER PUBLICATIONS

Eric Huang and Richard E. Korf "Optimal rectangle packing: an absolute placement approach", Journal of Artificial Intelligence Research 46 (2012) 47-87.

(Continued)

*Primary Examiner* — Andrew R Dyer
(74) *Attorney, Agent, or Firm* — Keller Jolley Preece

(57) ABSTRACT

The present disclosure includes systems, methods, and non-transitory computer readable media that utilize a genetic framework to generate enhanced digital layouts from digital content fragments. In particular, in one or more embodiments, the disclosed systems iteratively generate a layout chromosome of digital content fragments, determine a fitness level of the layout chromosome, and mutate the layout chromosome until converging to an improved fitness level. The disclosed systems can efficiently utilize computing resources to generate a digital layout from a layout chromosome that is optimized to specified platforms, distribution audiences, and target optimization goals.

20 Claims, 11 Drawing Sheets

(56) References Cited

U.S. PATENT DOCUMENTS

| | | | | |
|---|---|---|---|---|
| 2012/0158952 A1* | 6/2012 | Seifert | .................. | G06Q 30/02 709/224 |
| 2014/0237338 A1* | 8/2014 | Hu | ...................... | G06F 17/2235 715/207 |
| 2017/0010758 A1* | 1/2017 | Mital | ...................... | G06Q 10/06 |
| 2017/0344656 A1* | 11/2017 | Koren | .................. | G06F 16/958 |
| 2018/0032626 A1* | 2/2018 | Ben-Aharon | ......... | G06F 17/211 |

OTHER PUBLICATIONS

González, Jesús, et al. "Web newspaper layout optimization using simulated annealing." IEEE Transactions on Systems, Man, and Cybernetics—Part B: Cybernetics, vol. 32, No. 5, Oct. 2002; pp. 686-691.

Gjermund Bø Brabrand, "Dynamic Layout Optimization for Newspaper Web Sites using a Controlled Annealed Genetic Algorithm", Master's thesis Master of Science in Media Technology 30 ECTS Department of Computer Science and Media Technology Gjøvik University College, 2008; pp. 1-44.

Elijah Patton Mensch, "Optimizing Website Design Through the Application of an Interactive Genetic Algorithm," A Senior Project submitted to the Division of Science, Mathematics, and Computing of Bard College, May 2016; pp. 1-86.

Georg Buscher, Edward Cutrell, and Meredith Ringel Morris, "What do you see when you're surfing?: using eye tracking to predict salient regions of web pages," CHI'09: Proceedings of the SIGCHI Conference on Human Factors in Computing Systems, Apr. 6, 2009, pp. 21-30, Association for Computing Machinery, New York, NY, United States.

E. G. Coffman, Jr., M. R. Garey, and D. S. Johnson, "Approximation algorithms for bin packing: a survey," Approximation algorithms for NP-hard problems, Aug. 1996, pp. 1-53, PWS Publishing Co., Boston, MA, USA.

Fung, Glenn, Romer Rosales, and Balaji Krishnapuram, "Learning rankings via convex hull separation," Advances in Neural Information Processing Systems, 2005, unpaginated—all 8 pages, Neural Information Processing Systems 2005.

Imran Sarwar Bajwa et al., "Web layout mining (WLM): A new paradigm for intelligent web layout design," Conference: IEEE 4th International Conference on Information and Communication Technology, Dec. 2006, unpaginated—all 6 pages.

Ranjitha Kumar et al., "Webzeitgeist: Design mining the web," CHI '13: Proceedings of the SIGCHI Conference on Human Factors in Computing Systems, Apr. 2013, pp. 3083-3092, SIGCHI 2013, Paris France.

Ranjitha Kumar et al., "Bricolage: example-based retargeting for web design," CHI '11: Proceedings of the SIGCHI Conference on Human Factors in Computing Systems, May 7, 2011, pp. 2197-2206, SIGCHI 2011, Vancouver, BC, Canada.

* cited by examiner

UTILIZING A GENETIC FRAMEWORK TO GENERATE ENHANCED DIGITAL LAYOUTS OF DIGITAL FRAGMENTS FOR CROSS-PLATFORM DISTRIBUTION TO CLIENT DEVICES

BACKGROUND

Recent years have seen significant improvements in digital media systems for generating digital content layouts. For instance, digital media systems now enable website developers to arrange digital content items in creating web page layouts for distribution to client devices. To illustrate, conventional digital media system can generate a web page layout from digital content items pre-mapped to an html page.

Although conventional digital media systems provide various tools for digital layout development, these systems have a number of shortcomings. For instance, conventional systems are inefficient. For example, conventional digital media systems often require manual development of web page layouts specific to individual platforms via distributed developer devices. In particular, to create web page layouts for display on a range of devices (e.g., laptops, mobile phones, wearables) conventional digital media systems utilize different developer devices operated by various developers to manually select and position layout elements within layouts targeted to each type of device. In addition, developer devices must access various distributed resources for every step of the development, testing, and modification cycle that produces individual layouts across various platforms.

Moreover, conventional digital media systems are inaccurate. For example, conventional systems often create digital layouts that emphasize inaccurate content for particular distribution audiences or platforms. To illustrate, even though conventional digital media systems utilize individual developer devices to generate different layouts, conventional systems generate layouts that are not aligned to particular audiences and optimization goals. Thus, client devices often receive inaccurate web page layouts that are not aligned to the interests or needs of the client device or associated users. This inaccuracy leads to users leaving websites or services associated with the digital layout and causes additional waste in computing resources in sending and receiving unnecessary digital content.

Furthermore, conventional digital media systems lack flexibility. For example, many conventional digital media systems are rigidly specific to particular types of layouts (e.g., only grid layouts), perform specific limited functions (e.g., only select digital content items or only arrange digital content items), or only operate in relation to a particular audience or goal. This rigidity further contributes to the accuracy and efficiency problems discussed above.

SUMMARY

One or more embodiments of the present disclosure provide benefits and/or solve one or more of the foregoing or other problems in the art with systems, methods, and non-transitory computer readable storage media that utilize a genetic framework to generate enhanced digital content layouts for cross-platform distribution. Specifically, in one or more embodiments, the disclosed systems utilize the genetic framework to iteratively mutate layout chromosomes of digital content fragments to improve a fitness level in relation to various audiences and/or target goals. For instance, the disclosed systems can mutate layout chromosomes to select experience fragments, size variants, and rankings that improve performance, relevance (e.g., content-affinities), and/or content diversity in digital layouts. Further the disclosed systems can utilize a bin-packing based decoding framework to fit an ordered set of digital content fragments from an optimized layout chromosome into one or more enhanced digital layouts. In this manner, the disclosed systems can improve the efficiency, accuracy, and flexibility of computing systems for developing and deploying digital layouts for a wide range of platforms, audiences, and objectives.

To illustrate, in one or more embodiments, the disclosed systems identify digital content fragments, performance metrics associated with the digital content fragments, and a distribution audience for a particular digital layout. The disclosed systems can utilize the identified performance metrics to generate a layout chromosome (including a subset of the identified digital content fragments). The digital layout design system can then determine a fitness level for the layout chromosome based on contribution, relevance, and/or diversity metrics associated with the digital content fragments. The disclosed systems can also generate a second layout chromosome by applying a mutation to the first layout chromosome. By comparing a second fitness level associated with the second layout chromosome to the first fitness level of the first layout chromosome, the disclosed systems can generate a final digital layout to provide to client devices of the distribution audience.

Additional features and advantages of one or more embodiments of the present disclosure will be set forth in the description that follows, and in part will be obvious from the description, or may be learned by practice of such example embodiments.

BRIEF DESCRIPTION OF THE DRAWINGS

The detailed description is described with reference to the accompanying drawings in which.

DETAILED DESCRIPTION

Figure 1:
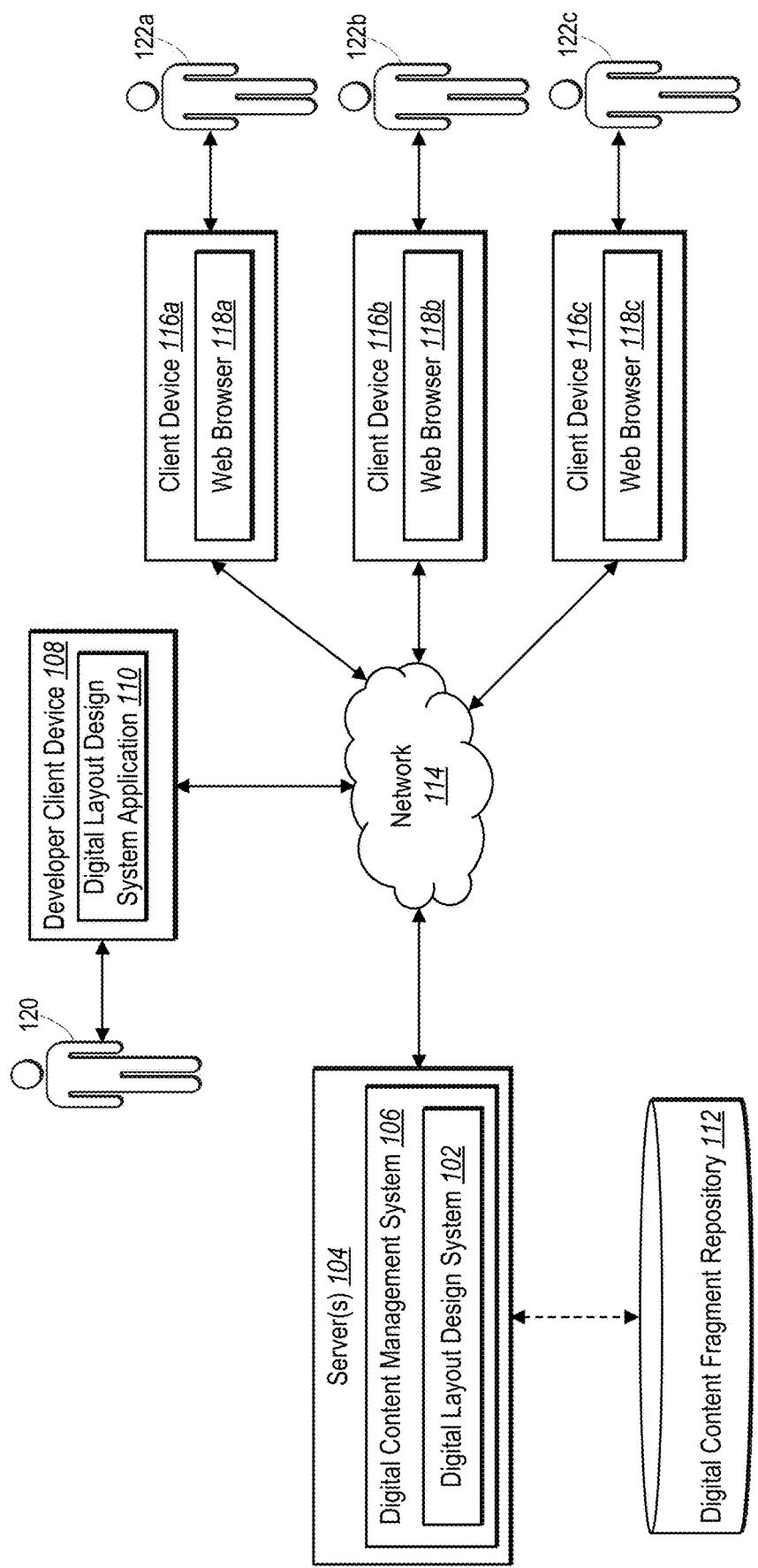
FIG. 1 illustrates an example environment in which a digital layout design system operates in accordance with one or more embodiments.

One or more embodiments of the present disclosure include a digital layout design system that utilizes a genetic framework to automatically select, modify, and arrange digital content fragments to generate enhanced digital layouts for cross-platform distribution. In particular, in one or more embodiments, the digital layout design system utilizes a genetic framework to generate a layout chromosome of digital content fragments. In one or more embodiments, the digital layout design system iteratively determines a fitness level and mutates the layout chromosome until the order, selection, and variants of digital content fragments within the layout chromosome reaches an improved (e.g., optimized) fitness level. For example, the digital layout design system can iteratively mutate the layout chromosome by reordering, resizing, or replacing digital content fragments in order to improve a fitness level reflecting performance, relevance, and diversity. The digital layout design system can further decode the improved layout chromosome to generate a finalized display. In this manner, the digital layout design system can efficiently, accurately, and flexibly utilize system resources to generate robust digital layouts for specific platforms, audiences, and optimization goals.

To illustrate, in one or more embodiments, the digital layout design system identifies digital content fragments, performance metrics associated with the digital content fragments, and a distribution audience for a digital layout (e.g., a web page layout). The digital layout design system can then utilize the identified performance metrics to generate a layout chromosome including a subset of the identified digital content fragments. With the layout chromosome generated, the digital layout design system determines a fitness level for the layout chromosome that is based on contribution, relevance, and/or diversity metrics associated with the digital content fragments included in the layout chromosome relative to a digital layout template specific to a particular platform and/or distribution audience. In one or more embodiments, the digital layout design system generates a second layout chromosome by applying a mutation to the first layout chromosome. Moreover, based on comparing a second fitness level associated with the second layout chromosome to the first fitness level of the first layout chromosome, the digital layout design system can decode the second layout chromosome to generate a final digital layout.

As just mentioned, one or more embodiments of the digital layout design system utilize a genetic framework to generate and mutate layout chromosomes to improve a fitness level. As described in greater detail below, a layout chromosome includes an arrangement of digital content fragments in a particular order or ranking. In particular, the digital layout design system can generate a layout chromosome by selecting a subset of digital content fragments (e.g., from a repository of content fragments), applying size variants to the digital content fragments, and ordering the digital content fragments in a particular ranking. For example, the digital layout design system can select a number of digital content fragments corresponding to available regions within a digital layout template and arrange the digital content fragments based on historical performance (e.g., performance metrics of each digital content fragment in relation to a particular audience).

In addition, as discussed, the digital layout design system can determine a fitness level of a layout chromosome based on a variety of metrics. In one or more embodiments, the digital layout design system determines a fitness level of the layout chromosome based on a contribution metric, a relevance metric, and/or a diversity metric. For example, the digital layout design system can determine a fitness level based on a contribution metric that reflects a fit between the performance metrics of digital content fragments of a layout chromosome and region importance metrics of individual regions available within a digital layout template. In addition, the digital layout design system can also determine a fitness level based on a relevance metric that reflects content affinity in relation to the distribution audience and the digital content fragments. Furthermore, the digital layout design system can determine a fitness level based on a diversity metric that reflects coverage and balance of the layout chromosome relative to various topics and content items of a content campaign.

Furthermore, as mentioned above, the digital layout design system can mutate layout chromosome in a variety of ways to improve the fitness level. For example, in one or more embodiments, the digital layout design system mutates the layout chromosome over multiple iterations in order to identify a ranking/position, size variant, and selection of digital content fragments that result in an improved (e.g., peak) fitness level. To illustrate, in at least one embodiment the digital layout design system mutates the layout chromosome at each iteration in one of three ways: by varying a size of a digital content fragment in the layout chromosome, by exchanging the ranking (e.g. order) of two digital content fragments in the layout chromosome, or by replacing a digital content fragment in the layout chromosome with a digital content fragment not currently in the layout chromosome. In some embodiments, the digital layout design system iteratively applies these mutations by sampling according to a probability distributions between the mutations at each iteration.

As mentioned, the digital layout design system can also generate a digital layout based on a layout chromosome. For example, the digital layout design system can utilize a bin-packing approach to decode digital content fragments from the layout chromosome into regions (e.g., bins) within a digital layout template. For example, in at least one embodiment, the digital layout design system sequentially assigns digital content fragments from the layout chromosome to regions within a digital layout template according to sizes of regions of the digital template layout, size variants of the digital content fragments, region importance metrics within the digital template layout, and rankings of the digital content fragments within the layout chromosome.

Once the digital layout design system decodes the layout chromosome into the final digital layout, the digital layout design system can distribute the final digital layout. For instance, the digital layout design system can distribute the final digital layout system to client devices associated with a target distribution audience.

As mentioned above, the digital layout design system can generate layouts specific to particular platforms, audiences, or optimization goals. Indeed, the digital layout design system can generate a variety of digital layouts for different platforms by analyzing different layout templates and then automatically selecting and arranging digital content fragments to regions within the layout templates. Similarly, the digital layout design system can generate different digital layouts for particular audiences or optimization goals by analyzing performance metrics for particular audiences or goals. For instance, by analyzing conversions for a particular audience, the digital layout design system can efficiently and accurately generate a digital layout optimized for conversions by the audience.

The digital layout design system provides a number of advantages over conventional systems. For example, the digital layout design system can improve efficiency relative to conventional systems. In particular, the digital layout design system can automatically generate a variety of content layouts that are tailored to specific platforms, distribution audiences, and optimization goals. Accordingly, the digital layout design system can avoid wasting computing resources, user interactions, and time devoted to repeatedly generating individual layouts via a variety of developer devices. Furthermore, rather than bogging down distributed computing resources with multiple development, testing, and modification cycles in order to generate an effective digital layout, the digital layout design system utilizes efficient and automatic iterations of layout chromosome mutation and decoding to generate a final digital layout.

Additionally, the digital layout design system improves accuracy. For instance, as just described, the digital layout design system determines a fitness level of layout chromosomes based, in part, on contribution metrics, relevance metrics, and diversity metrics. Accordingly, the digital layout design system can generate digital layouts that arrange digital content fragments in positions that are more likely to improve performance while emphasizing relevant content fragments that canvass important and diverse topics of a content campaign. Accordingly, the digital layout design system can generate a digital layout that is relevant and effectively aligned to client devices of a distribution audience while still addressing the diverse topics and content types significant to a digital content campaign.

Furthermore, the digital layout design system improves flexibility relative to conventional systems. For example, the digital layout design system provides a generic solution that is not tied to a particular type of digital layout. Thus, for instance, the digital layout design system is not limited to grid layouts, but can be flexibly extended to any type of layout scheme. Moreover, the digital layout design system is not rigidly focused on a specific portion of generating digital layouts. Rather, the digital layout design can provide an end-to-end solution that automatically selects, modifies, and arranges (e.g., distributes) digital content fragments within a digital layout. Furthermore, as mentioned above, the digital layout design system can tailor generation of a final digital layout to a wide array of platforms, distribution audiences, and optimization goals. Thus, in one or more embodiments, the digital layout design system flexibly generates digital layouts that robustly account for a wide range of developer specifications.

As illustrated by the foregoing discussion, the present disclosure utilizes a variety of terms to describe features and advantages of the digital layout design system. Additional detail is now provided regarding the meaning of such terms. For example, as used herein, the term "digital content fragment" refers to a digital content item, such as digital media, a digital image, a digital video, and/or digital text. In particular, a digital content fragment includes a digital content item that can be utilized and/or displayed as part of a digital layout (e.g., a web page). A digital content fragment can include one or more variations/variants. For example, a digital content fragment can include variations in size, color, shape, and/or duration that the digital layout design system can select and/or modify.

In one or more embodiments, a digital content fragment is associated with one or more performance metrics. As used herein, a "performance metric" refers to an indication of (historical or anticipated) results associated with utilizing a digital content fragment. In particular, a performance metric includes (historical or anticipated) user interactions with a client device upon transmitting the digital content fragment to the client device. For example, performance metrics can include conversions, purchases, revenue, clicks, click-throughs, and/or downloads associated with a digital content fragment. To illustrate, a conversion performance metric for a digital content fragment can include historical conversions that resulted from utilizing the digital content fragment in a digital layout.

As used herein, a "digital layout" refers to a particular arrangement of digital content for display. In particular, a digital layout includes an arrangement of digital content fragment in an electronic document for display via a client device. A digital layout can take a variety of forms, including a web page layout, a digital communication (e.g., email) layout, or a magazine (e.g., digital magazine) layout. In one or more embodiments, a digital layout is represented as a two-dimensional grid of regions, but includes a variety of alternative representations. For instance, a digital layout can include shape flow layouts (e.g., a plurality of connected circular regions where attention flows from one circle to the next) or a free-flow layout (where any portion can be populated with a digital content fragment).

As used herein, a "digital layout template" refers to an electronic document with one or more regions (e.g., bins) for displaying digital content fragments. For instance, a digital layout template includes an unpopulated (or blank) digital layout. Thus, a digital layout template can include a web page with unpopulated regions (e.g. elements or slots) for displaying digital content fragments. A digital layout template can be tailored to a particular platform (e.g., a first template for a mobile device and a second template for personal computers).

As used herein, a "region" refers to a display area within a digital layout and/or digital layout template. For instance a region can include an element (e.g., a bin) defined within a web page for displaying a digital content fragment. In one or more embodiments, regions in a digital layout are associated with a size and a position.

As used herein, a "layout chromosome" refers to a representation of digital content fragments in an order or ranking. In particular, a layout chromosome includes a representation of digital content fragments in an order or ranking that can be modified or mutated to change the digital content fragments and/or the order/ranking. For example, a layout chromosome includes an ordered set of digital content fragments maintained in a list or array. Thus, in at least one embodiment, every digital content fragment maintained in a layout chromosome is associated with a rank based on its position within the layout chromosome.

As used herein, a "fitness level" of a layout chromosome refers to a measure of predicted fit for a layout chromosome and/or digital layout. In particular, a fitness level includes a measure of fit between a layout chromosome and a platform, audience, and/or digital content campaign. As will be described in greater detail below, in one or more embodiments, For instance, fitness level can include a predicted measure of contribution (e.g., performance metrics and content placement), relevance (e.g., content affinity and theme relevance), diversity (e.g., balance and coverage). Thus, in one or more embodiments, the digital layout design system determines the fitness level of a particular layout chromosome based on a relevance metric, a contribution metric, and/or a diversity metric.

As used herein, a "relevance metric" refers to a measure of relevance between a digital content fragment and one or more users. In particular, a relevance metric includes a measure of content affinity between a digital content fragment and a distribution audience. A relevance metric also includes a measure of relevance between a digital content fragment and a theme of a digital layout intended for a distribution audience. Similarly, a relevance metric includes a measure of content affinity between a digital content fragment and determined interests or actions of one or more users.

As used herein, a "contribution metric" refers to a measure of performance of digital content fragments in relation to position of the digital content fragments in a digital layout. In particular, a contribution metric includes a reflection of performance metrics for digital content fragments weighted by region importance metrics. Thus, a contribution metric includes a measure of the extent to which digital content fragments having significant (e.g., high) performance metrics are placed in significant (e.g., important) positions within a digital layout.

As used herein, a "diversity metric" refers to a measure of diversity of digital content fragments in a layout chromosome and/or digital layout. For instance, a diversity metric includes a measure of coverage and/or balance of attributes reflected in digital content fragments. For example, a diversity metric includes a measure of coverage and/or balance of topics or digital content fragment types included in a digital layout (e.g., relative to topics or digital content types available for a digital content campaign).

In one or more embodiments, the digital layout design system determines a diversity metric based on a coverage metric and a balance metric. As used herein a "coverage metric" refers to a measure of the extent to which important or significant attributes are reflected in a digital layout and/or layout chromosome. A "balance metric" refers to a measure of the extent to which all attributes from a set of attributes (e.g., a set of attributes in a digital content campaign) are reflected in a digital layout and/or layout chromosome. Additional detail regarding these metrics are provided below.

As used herein, a "mutation" of a layout chromosome refers to one or more transformations or modifications of the layout chromosome. For example, as described in greater detail below, a mutation can include: varying a size of a digital content fragment in the layout chromosome, exchanging a position of a first digital content fragment with a position of a second digital content fragment within the layout chromosome, or replacing a digital content fragment in the layout chromosome with a digital content fragment from a collection of additional digital content fragments not currently in the layout chromosome. A mutation can also include a variety of additional modifications, such as a change in color, duration, or alignment.

As used herein, a "region importance metric" refers to a measure of salience or significance of a region in a digital layout template. In particular, region importance metric can include a two-dimensional viewer salience rating of a region in a digital layout template. For instance, a region importance metric can include a two-dimensional salience measure based on eye tracking of regions on a web page in relation to a plurality of users. For instance, a region importance metric can rank regions of a layout (e.g., from 1 to 10 or some other scale) based on salience of the regions to a viewer. Additional detail regarding example regional important metrics is provided by G. Buscher, E. Cutrell, and M. R. Morris, What do you see when you're surfing?: using eye tracking to predict salient regions of web pages, SIGCHI Conference on Human Factors in Computing Systems (2009), which is incorporated by reference in its entirety.

Additional detail regarding the digital layout design system will now be provided in relation to illustrative figures. For example, FIG. 1 illustrates an example environment 100 in which the digital layout design system 102 can operate.

For example, as shown in FIG. 1, the environment 100 includes the digital layout design system 102 operating as part of a digital content management system 106 on server(s) 104 associated with a digital content fragment repository 112. Additionally, the environment 100 includes a network 114 that connects the server(s) 104 to a developer client device 108, and client devices 116a, 116b, and 116c. Additional information regarding the network 114 is provided below in reference to FIG. 9.

Any of the developer client device 108 and the client devices 116a-116c may include a computing device such as a desktop computer, a notebook or laptop computer, a netbook, a tablet computer, an e-book reader, a GPS device, a camera, a personal digital assistant (PDA), a handheld electronic device, a cellular telephone, a smartphone, and/or other suitable electronic device (as described in greater detail below in relation to FIG. 9). Moreover, each of the client devices 116a-116c and the developer client device 108 can access and/or communicate with each other and/or the server(s) 104.

As shown in FIG. 1, each of the client devices 116a-116c is operated by a user 122a, 122b, and 122c, respectively. Similarly, the developer client device 108 is operated by a developer 120. In one or more embodiments, the users 122a-122c are users targeted by the digital layout design system 102 to be provided with one or more digital content fragments as part of a digital layout. In one or more embodiments, the developer 120 is a digital layout design system user who configures and provides requests for the digital layout design system 102 to generate targeted digital layouts for one or more platforms and/or optimization goals.

In at least one embodiment, the developer 120 can select or provide a digital layout template for use in generating an enhanced digital layout. For example, in one embodiment, the digital layout design system 102, via the server(s) 104, receives a digital layout template as part of a developer request to generate an enhanced digital layout. In some embodiments, the developer request can also include digital content fragments, distribution audience demographic information, platform specifications, or other developer preferences.

In one or more embodiments, the server(s) 104 may include a variety of servers, sub-systems, programs, modules, logs, and data stores. In particular embodiments, the server(s) 104 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Additional detail regarding the server(s) 104 are provided below (e.g., in relation to FIG. 9).

As shown in FIG. 1, the server(s) 104 include the digital content management system 106. The digital content management system 106 can store, manage, utilize, and distribute digital content (including digital layouts) to client devices. For example, in at least one embodiment, the digital content management system 106 can provide digital layouts to client devices as web pages. In one or more embodiments, the digital content management system 106 comprises a digital content campaign management system that implements digital content campaigns by providing coordinated (e.g., brand-conforming) digital content via one or more distribution channels (e.g., via web sites, digital messages such as email, or social media). To illustrate, based on campaign parameters (e.g., specified target user demographics and campaign objectives), the digital content management system 106 can provide a web page including an enhanced digital layout to one or more of the client devices 116a-116c. Any of the users 122a-122c of the client devices 1161-116c can view and interact with the provided web page via the web browsers 118a, 118b, 118c, respectively.

In one or more embodiments, the components of the digital layout design system 102 may be located on, or implemented by, one or more computing devices. For example, in relation to FIG. 1, the digital layout design system 102 is implemented as part of the digital content management system 106 on the server(s) 104. Alternatively, the digital layout design system 102 may be installed as a native application, a web browser plugin, or another type of application plugin (e.g., a social media application plugin) on the developer client device 108.

In at least one embodiment, as shown in FIG. 1, the developer client device 108 can include the digital layout design system application 110. For example, the digital layout design system application 110 can be a native application installed on the developer client device 108 that includes graphical user interfaces, controls, and other elements that enable the developer 120 to access and utilizes features of the digital layout design system 102. Alternatively, the digital layout design system application 110 may operate as a web browser plugin that enables the developer client device 108 to access features of the digital layout design system 102 via one or more web pages.

In one or more embodiments, the digital layout design system 102 is associated with a digital content fragment repository 112. In at least one embodiment, the digital content fragment repository 112 stores and maintains digital content fragment data. For instance, the digital content fragment repository 112 can include digital content fragments associated with one or more digital content campaigns for one or more developers. The digital content fragment repository 112 may be hosted by the server(s) 104 or may be remotely hosted by one or more additional servers.

Figure 2A:
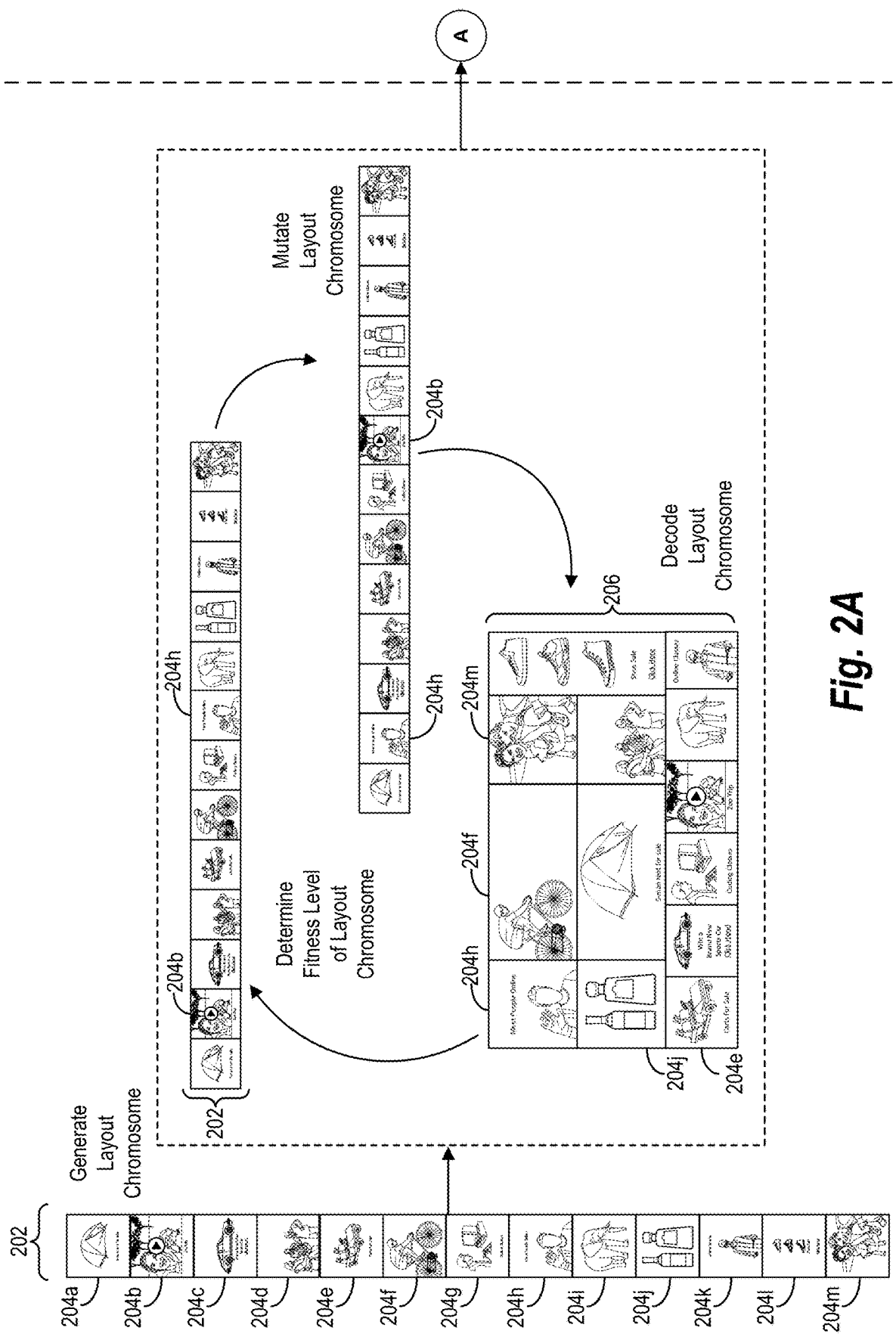
FIGS. 2A-2B illustrate an example overview of the digital layout design system in accordance with one or more embodiments.
Figure 2B:
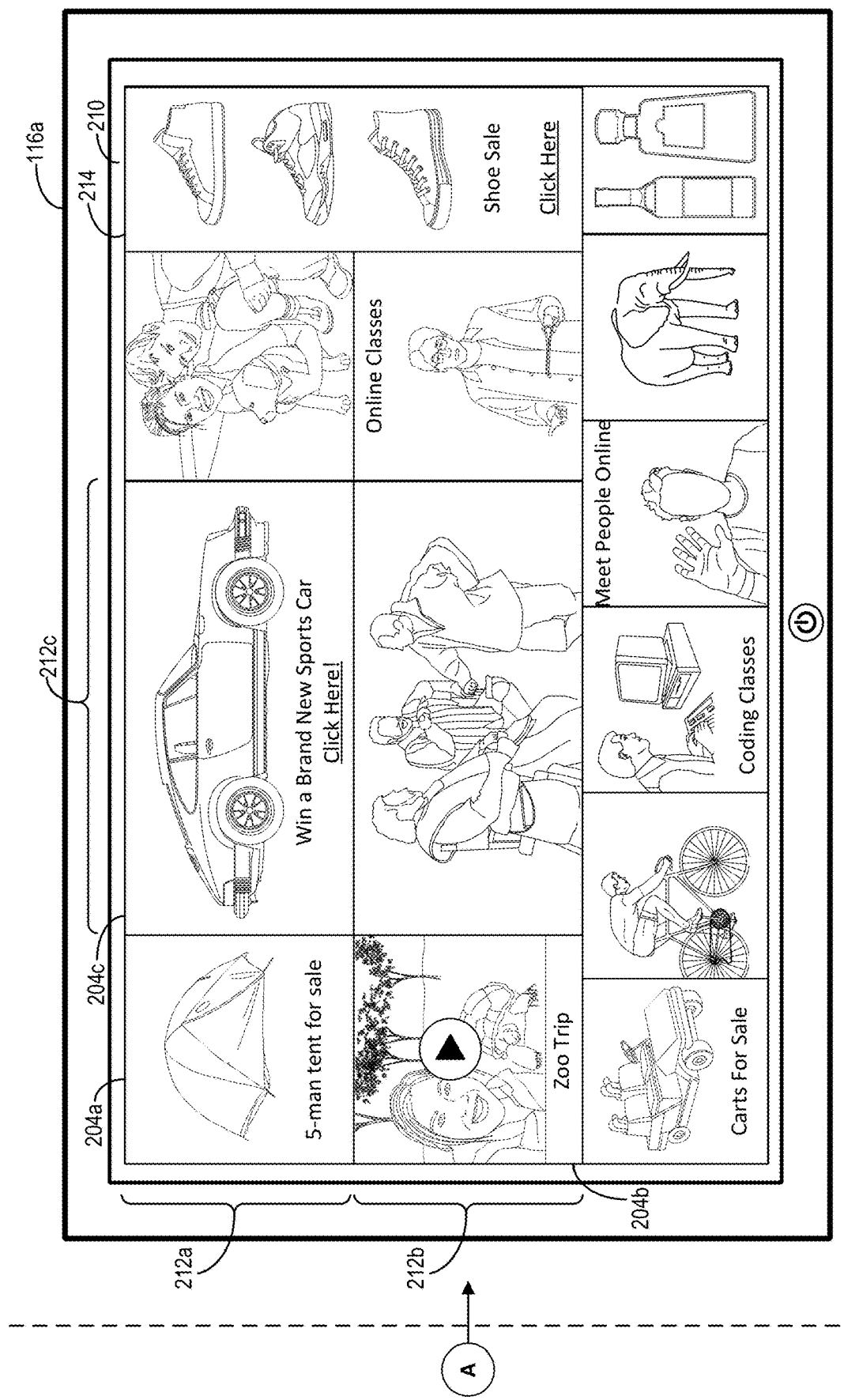

FIGS. 2A-2B illustrates an overview of the features and functionality provided by the digital layout design system 102 in accordance with one or more embodiments. For example, in one or more embodiments, the digital layout design system 102 generates an enhanced digital layout by generating a layout chromosome 202. As shown in FIG. 2A, the digital layout design system 102 generates the layout chromosome 202 with a subset of digital content fragments 204a-204m. In at least one embodiment, the digital layout design system 102 selects the subset of digital content fragments 204a-204m from a larger candidate set of digital content fragment (e.g., digital content fragments associated with a digital content campaign). In particular, the digital layout design system 102 selects the subset of digital content fragments 204a-204m based on performance metrics associated with each of the digital content fragments 204a-204m. For example, the digital layout design system 102 can select each of the subset of digital content fragments 204a-204m in ranked order based on their associated performance metrics from the larger candidate set of digital content fragments.

After generating the layout chromosome 202, the digital layout design system 102 begins an iterative process of enhancing the layout chromosome 202 to improve a fitness level. For example, as shown in FIG. 2A, the digital layout design system 102 determines a fitness level of the layout chromosome 202. In one or more embodiments, the digital layout design system 102 determines the fitness level of the layout chromosome 202 based on various metrics associated with the layout chromosome 202. For example, the digital layout design system 102 can utilize metrics including, but not limited to, a contribution metric, a relevance metric, and a diversity metric. As will be described in greater detail below (e.g., in relation to FIG. 3A), the contribution metric associated with the layout chromosome 202 reflects both performance metrics of the digital content fragments 204a-204m and corresponding region importance metrics associated with regions in a digital layout template. Moreover, the relevance metric associated with the layout chromosome 202 reflects the relevance of the digital content fragments 204a-204m in relation to a distribution audience (e.g., the client devices 116a-116c) and/or relative to one or more topics associated with a digital layout template. Further, the diversity metric reflects the coverage and balance of the digital content fragments 204a-204m in relation to the topics and digital content types available (e.g., available in a repository of digital content fragments for the digital content campaign).

In order to enhance the layout chromosome 202 and improve the fitness level, the digital layout design system 102 mutates the layout chromosome 202 in each iteration illustrated in FIG. 2A. For example, as shown in FIG. 2A, after computing a fitness level associated with the layout chromosome 202, the digital layout design system mutates the layout chromosome 202 in various ways. For instance, the digital layout design system 102 can mutate the layout chromosome 202 by varying a size of one digital content fragment within the layout chromosome 202, or by replacing a digital content fragment in the layout chromosome 202 with a digital content fragment that is not currently in the layout chromosome 202. Additionally, as illustrated in FIG. 2A, the digital layout design system 102 can exchange the positions of two digital content fragments (e.g., the digital content fragments 204b and 204h) within the layout chromosome 202. In one or more embodiments, the digital layout design system 102 only performs one of the above described mutations in connection with the layout chromosome 202 in each iteration illustrated in FIG. 2A.

As further illustrated in FIG. 2A, the iterative process conducted by the digital layout design system 102 also includes decoding the layout chromosome 202 into a digital layout 206. In one or more embodiments, the digital layout design system 102 decodes the layout chromosome 202 by utilizing region importance metrics in connection with a digital layout template. For example, as mentioned above, the digital layout template can include sizes and positions of regions of a particular digital layout. Additionally, as mentioned above, region importance metrics cam reflect salience of particular areas or regions of a layout. In one or more embodiments, the digital layout design system 102 arranges the regions of the digital layout according the region importance metrics (e.g., ranks the regions of the digital layout). Moreover, the digital layout design system 102 assigns an exponentially-decaying weight to every region (e.g., bin) in the digital layout according to the region importance metrics. In this manner, the digital layout design system 102 can approximate the decaying interest of users in relation to the salient regions of a digital layout.

Thus, in at least one embodiment, and as will be described in greater detail below, the digital layout design system 102 decodes the layout chromosome 202 by first overlaying region importance metrics over the regions of a given digital layout template. The digital layout design system 102 then iterates through each region in the digital layout template in order of its associated region importance metric. For each region, the digital layout design system 102 identifies a size associated with the region and identifies a highest ranked digital content fragment in the layout chromosome 202 with a size that corresponds to the size of the region. The digital layout design system 102 then assigns the identified digital content fragment to the region and moves to another region in the digital layout template associated with the next highest region importance metric. Utilizing this "greedy" approach, the digital layout design system 102 fills every region in the digital layout template with digital content fragments from the layout chromosome 202 until the digital layout 206 is generated. Additional detail regarding decoding layout chromosomes is provided below (e.g., in relation to FIG. 5).

In one or more embodiments, the digital layout design system 102 continues to iterate through the fitness, mutation, and decoding acts until a threshold level of stability is achieved. For example, in at least one embodiment, the digital layout design system 102 monitors the computed fitness levels of the layout chromosome 202 as it is mutated over many iterations. In response to determining that the computed fitness level achieves a threshold level of stability (e.g., the fitness level only changes a threshold amount across a threshold number of iterations), the digital layout design system 102 ends the iterative process illustrated in FIG. 2A and decodes a final version of the layout chromosome 202 into a final digital layout. In other embodiments, the digital layout design system 102 iterates until satisfying a time threshold or until reaching a threshold number of iterations.

As mentioned, upon determining convergence after a number of iterations, the digital layout design system 102 can generated a digital layout. For example, as shown in FIG. 2B, the digital layout design system 102 decodes the layout chromosome 202 into the final digital layout 214 and provides the final digital layout 214 to the client device 116a for viewing on the display 210. As shown, the final digital layout 214 includes one or more regions that each include at least one digital content fragment. For example, as illustrated in FIG. 2B, the region 212a includes the digital content fragment 204a, the region 212b includes the digital content fragment 204b, and the region 212c includes the digital content fragment 204c. Some digital content fragments include digital images (e.g., the digital content fragments 204a, 204c), text (e.g., the digital content fragments 204a, 204b, and 204c), hyperlinks (e.g., the digital content fragment 204c), and/or digital video (e.g., the digital content fragment 204b).

Furthermore, each region in the final digital layout 214 is associated with a position and size. For example, the regions 212a and 212b are associated with smaller sizes than the size associated with the region 212c. In one or more embodiments, the size and position of each region in the final digital layout 214 remain static even though each region can be associated with any digital content fragment (although in other embodiments, the size and/or position are variable). In relation to the embodiment of FIG. 2B, the digital layout design system 102 associates each region in the final digital layout 214 with a weight based on a region importance metric. For example, the digital layout design system 102 associate the region 212a with the weight, while associating lighter weights to regions in the final digital layout 214 moving left to right and top to bottom.

As shown in FIG. 2B, in one or more embodiments, the digital layout design system 102 provides the final digital layout 214 to the client device 116a as part of a web page displayed by the web browser 118a installed on the client device 116a. In additional or alternative embodiments, the digital layout design system 102 can provide the final digital layout 214 as part of a graphical user interface displayed by a native application or other type of executable.

Figure 3A:
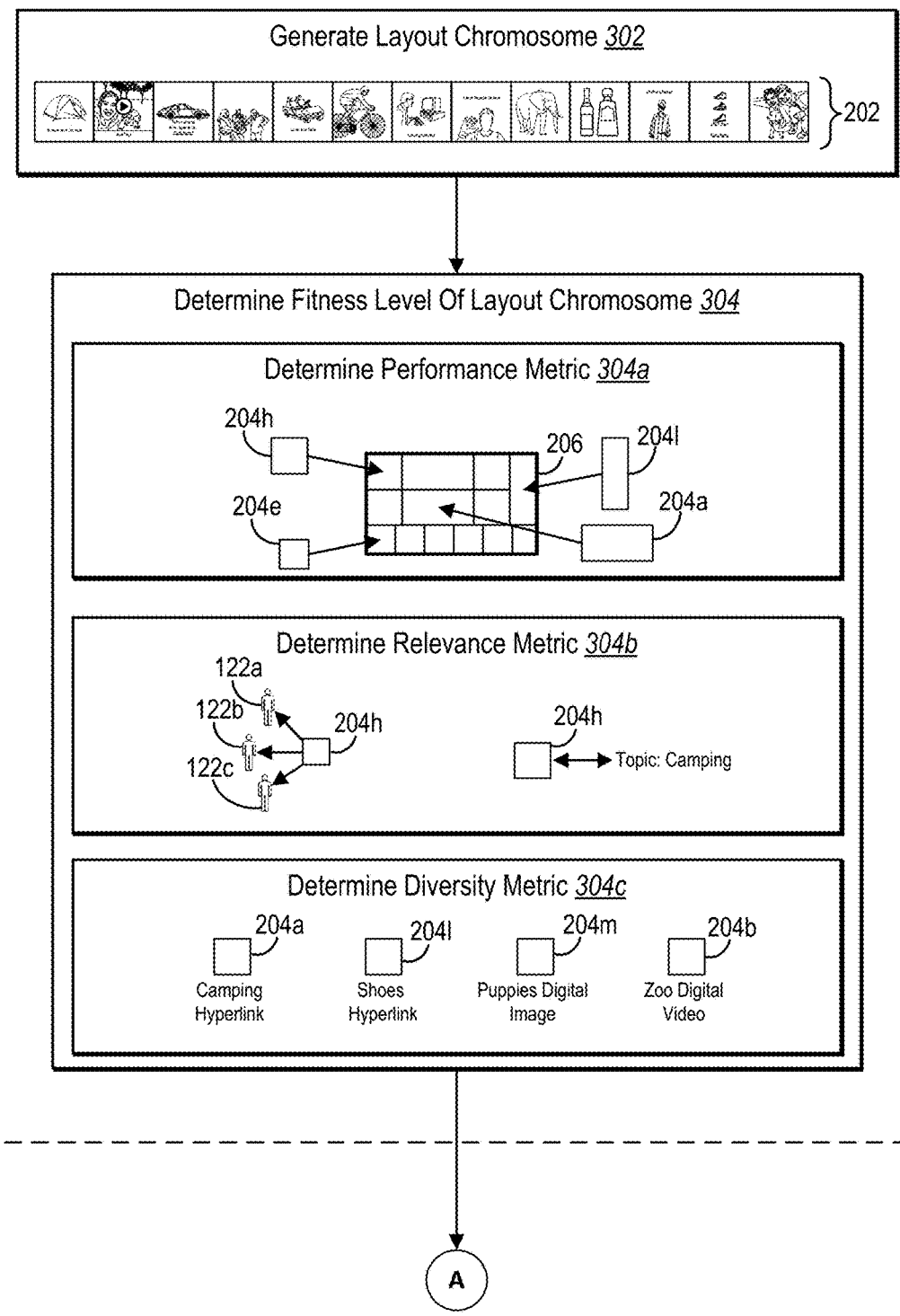
FIGS. 3A-3B illustrate determining a fitness level and decoding digital content fragments in accordance with one or more embodiments.
Figure 3B:
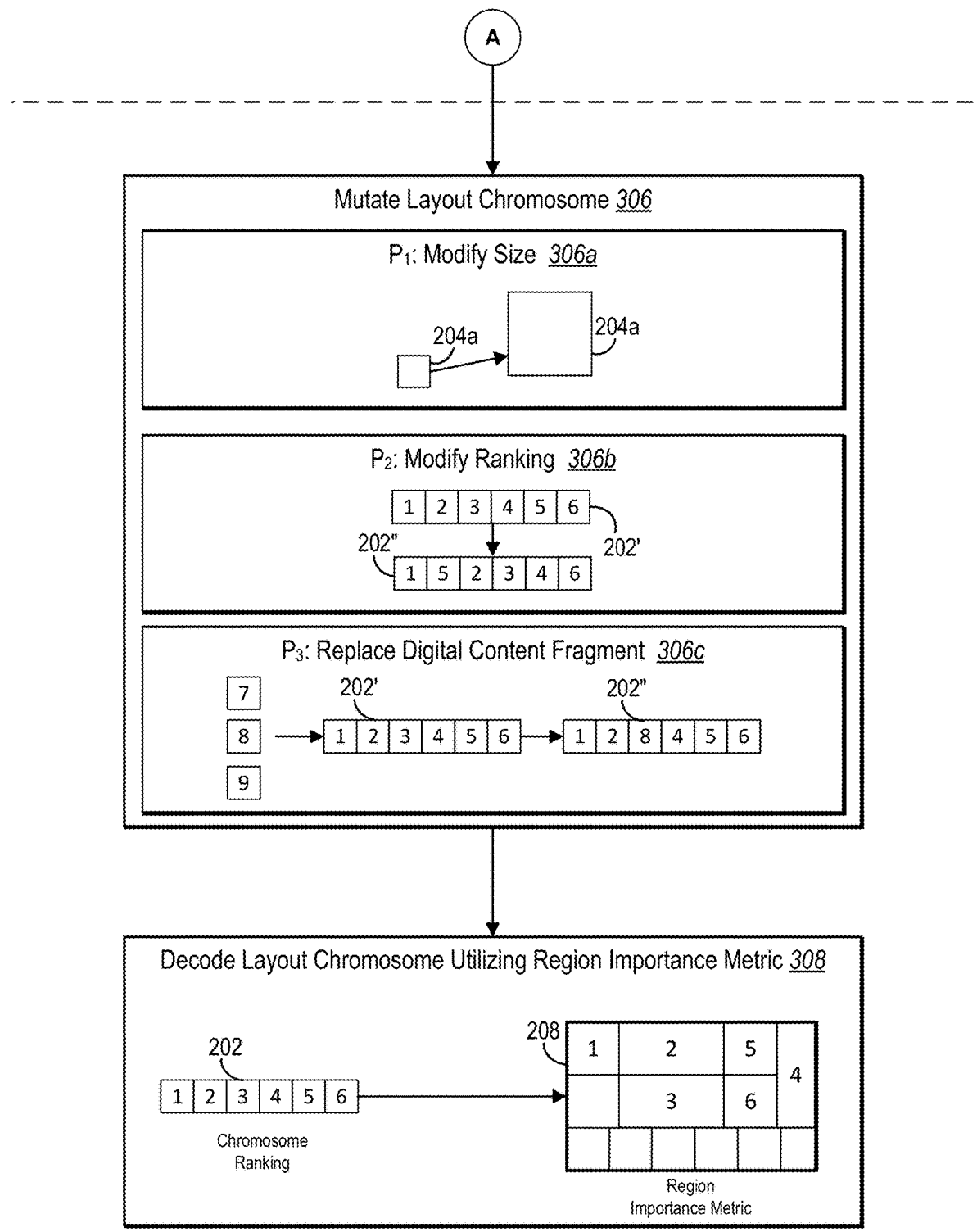

FIGS. 3A and 3B provide additional detail regarding generating layout chromosomes, determining fitness levels, mutating layout chromosomes, and decoding layout chromosomes in accordance with one or more embodiments. For example, as shown in FIG. 3A, the digital layout design system 102 performs an act 302 of generating a layout chromosome (e.g., the layout chromosome 202). In one or more embodiments, the digital layout design system 102 generates the layout chromosome 202 by identifying a subset of digital content fragments from a larger candidate set of digital content fragments. For instance, the developer 120 may submit the larger candidate set of digital content fragments as part of a request (e.g., via the digital layout design system application 110) for the digital layout design system 102 to generate an enhanced digital layout.

To illustrate, the developer 120, via the developer client device 108, can define parameters for a digital content campaign. As part, of providing the digital content campaign parameters, the developer client device 108 can provide digital content fragments associated with the digital content campaign (i.e., the larger candidate set of digital content fragments). Moreover, the developer client device 108 can also provide additional data, such as digital layout templates, topics (e.g., topics corresponding to the templates or the digital content campaign), themes, preferred distribution channels, or preferred audiences (e.g., targeting parameters).

In one or more embodiments, the digital layout design system 102 identifies the larger candidate set of digital content fragments from the digital content fragment repository 112. For example, the developer 120 may include a digital layout template as part of a request for the digital layout design system 102 to generate an enhanced digital layout. As mentioned above, in one or more embodiments, the digital layout template is associated with metadata including one or more topics, keywords, or themes. In at least one embodiment, the digital layout design system 102 can identify the larger candidate set of digital content fragments from the digital content fragment repository 112 by searching the digital content fragment repository 112 for digital content fragments associated with the one or more topics, keywords, or themes.

For example, the digital layout design system 102 can search for the larger candidate set of digital content fragments utilizing digital image analysis (e.g., to identify digital content fragments including digital images or digital video still images associated with the one or more topics, keywords, or themes), text analysis (e.g., to identify digital content fragments including text or other metadata associated with the one or more topics, keywords, or themes), or any other type of machine learning. Additionally or alternatively, the developer 120 can manually submit one or more topics, keywords, or themes in order for the digital layout design system 102 to identify the larger candidate set of digital content fragments from the digital content fragment repository 112.

Regardless of whether the larger candidate set of digital content fragments is provided by the developer 120 or identified by the digital layout design system 102, the digital layout design system 102 can generate the layout chromosome 202 by identifying a subset of digital content fragments from the larger candidate set for inclusion in the layout chromosome 202. In one or more embodiments, the digital layout design system 102 identifies the subset of digital content fragments based on performance metrics associated with each digital content fragment in the larger candidate set.

For example, as described above, each digital content fragment is associated with one or more performance metrics associated with various target optimization goals. For example, the digital layout design system 102 (or the digital content management system 106) can monitor performance of digital content fragments provided to various client devices. To illustrate, the digital content management system 106 can monitor views, clicks, purchases, conversions, or other performance metrics for digital content fragments provided to the client devices 116a-116c. The digital layout design system 102 can identify and utilizes these performance metrics in generating digital layouts.

The digital layout design system 102 can determine what particular performance metrics are pertinent to a particular digital layout. For instance, in at least one embodiment, the developer 120 specifies (e.g., via the digital layout design system application 110) one or more optimization goals as part of the request for the digital layout design system 102 to generate an enhanced digital layout. Thus, for example, if the developer has specified click-throughs as an optimization goal for the enhanced digital layout, the digital layout design system 102 can identify performance metrics for each digital content fragment in the candidate set that are associated with click-throughs.

In relation the act 302 of FIG. 3A, the digital layout design system 102 generate the layout chromosome 202 by ordering digital content fragments based on the identified performance metrics, and then selecting a subset of the ordered digital content fragments for inclusion in the layout chromosome. In at least one embodiment, the number of digital content fragments included in the subset is based on a digital layout template (e.g., either provided by the developer 120 as part of the request, or identified by the digital layout design system 102). For example, if a digital layout template includes twenty regions, the digital layout design system 102 determines the subset of ordered digital content fragments will include twenty digital content fragments. In additional or alternative embodiments, the digital layout design system 102 may include a number of ordered digital content fragments in the subset that is higher than the number of regions in the digital layout template.

In at least one embodiment, the digital layout design system 102 selects the subset of ordered digital content fragments in descending order starting at the digital content fragment with the highest performance metric. Accordingly, at the act 302, the digital layout design system 102 generates a layout chromosome that includes a subset of highest performing digital content fragment, where the number of digital content fragments in the layout chromosome corresponds to the number of regions in an associated digital layout template.

After generating an initial layout chromosome (e.g., in the act 302), the digital layout design system 102 performs the act 304 of computing the fitness level of the layout chromosome. As mentioned above, the digital layout design system 102 computes the fitness level of a layout chromosome based on various metrics. In one or more embodiments, the digital layout design system 102 computes the fitness level of the layout chromosome 202 based on a contribution metric, a relevance metric, and a diversity metric. In at least one embodiment, the digital layout design system 102 computes the fitness of the layout chromosome 202 as a monotonic function of these metrics with a corresponding weight for each metric. Thus, the final fitness level computation for a layout chromosome can reflect the utility of the layout chromosome as a digital layout. In additional or alternative embodiments, the digital layout design system 102 can include additional or alternative metrics as part of the fitness level computation.

Additional detail will now be provided regarding each of the contribution, relevance, and diversity metrics. For example, as shown in FIG. 3A, the digital layout design system 102 performs an act 304a of determining the contribution metric associated with the layout chromosome 202. As mentioned above, the contribution metric reflects an overall performance of the digital content fragments of the layout chromosome relative to region importance metrics. In one or more embodiments, to make this determination the digital layout design system 102 first performs an intermediate decoding process and decodes the layout chromosome 202 into a digital layout 206 utilizing a received or identified digital layout template.

With the digital content fragments (e.g., the digital content fragments 204h, 204e, 204l, and 204a) positioned within regions of the digital layout 206, the digital layout design system 102 determines the contribution metric utilizing region importance metrics. As mentioned above, a region importance metric associated with a region of a digital layout reflects a measure of salience to users/viewers of a digital layout. For instance, the region importance metric can reflect a salience rating of different regions within a digital layout. Accordingly, with the one or more region importance metrics overlaid on the digital layout 206, the digital layout design system 102 applies a weight to the performance metric for each digital content fragment that corresponds to the nearest overlaid region importance metric.

For example, if the region importance metric associated with the region of the digital layout 206 where the digital content fragment 204h is positioned is high (e.g., because the top, left-hand corner of digital layouts is historically important to users), the digital layout design system 102 will apply a heavy weight to the performance metric associated with the digital content fragment 204h. Conversely, if the region importance metric associated with the region of the digital layout 206 where the digital content fragment 204e is positioned is lower, the digital layout design system 102 will apply a lighter weight to the performance metric associated with the digital content fragment 204e.

As mentioned above, in one or more embodiments, the digital layout design system 102 determines weights for particular regions by applying a function to the region importance metrics. In particular, the digital layout design system can apply an exponential decay function based on the region importance metrics to generate weights that are applied to the performance metrics. For instance, the digital layout design system 102 can rate each region (e.g., bin) of a digital layout and then apply an exponentially decaying weight to each rated region (e.g., bin) to generate and apply weights to the performance metrics corresponding to each region.

After applying a weight based on region importance metrics to the performance metric of each digital content fragment in the digital layout 206, the digital layout design system 102 totals the weighed performance metrics into the contribution metric for the layout chromosome 202.

As mentioned above, the digital layout design system 102 can also determine the fitness level of the layout chromosome 202 based on a relevance metric. For example, FIG. 3A illustrates the digital layout design system 102 performing the act 304b of determining a relevance metric associated with the layout chromosome 202. As discussed above, the relevance metric associated with a layout chromosome reflects the relevance of the digital content fragments within that chromosome relative to a distribution audience, and/or relative to one or more topics associated with an associated digital layout template. Accordingly, in order to determine a relevance metric associated with the layout chromosome 202 relative to a distribution audience (e.g., the users 122a-122c), the digital layout design system 102 determines an association between each digital content fragment within the layout chromosome 202 and the distribution audience.

The digital layout design system 102 can utilize a variety of approaches to determine a relevance metric. For instance, the digital layout design system 102 can utilize a variety of content or category affinity algorithms (e.g., Adobe Target), semantic comparison algorithms, relevancy ranking algorithms, or machine learning models (e.g., neural network or regression algorithms) to determine a relevance metric.

For example, the digital layout design system 102 can utilize artificial intelligence to build content affinity profiles based on historical behavior samples for individual users or a collection of users (e.g., an audience). Moreover, the digital layout design system 102 can build content interest graphs for individual users (or collections of users) based on historical user interactions (e.g., with digital content fragments). The digital layout design system can apply these content affinity profiles or interest graphs to determine a relevance metric in relation to a particular user/client device or audience.

The digital layout design system 102 can also determine a relevance metric based on semantic similarity. For instance, in one or more embodiments, the digital layout design system converts digital text, images, or videos to a first semantic vector. For example, the digital layout design system can utilize a classifier to identify descriptive terms portrayed in a digital video or digital image. Moreover, the digital layout design system can convert terms or text to a semantic feature vector utilizing a word to vector algorithm. In addition, the digital layout design system can convert topics or themes to a second semantic vector (e.g., using a word to vector algorithm). The digital layout design system can then compare (e.g., take the difference) between the first semantic vector and the second semantic vector to identify the relevance metric.

In one or more embodiments, the digital layout design system 102 can utilize a supervised machine learning model (e.g., neural network) to determine a relevance metric between a distribution audience and digital content fragments. For instance, the digital layout design system can utilize a neural network to predict digital content fragments relevant to particular users or themes and compare the predictions to ground truth. Utilizing a loss function, the digital layout design system can train the machine learning model to accurately predict a relevance metric for new digital content fragments.

Similarly, the digital layout design system 102 can utilize a variety of regression algorithms to determine associations between features of digital content fragments and distribution audiences and/or themes/topics. For instance, the digital layout design system 102 can compare features of digital content fragments with historical user profiles, interests, or actions of an audience to determine correlations between the features and particular users or audiences. The digital layout design system can then combine/weight correlations for a new digital content fragment to generate a relevance metric.

Furthermore, as mentioned above, the digital layout design system 102 computes the fitness level of the layout chromosome 202 based on a diversity metric. For example, FIG. 3A illustrates the digital layout design system 102 performing the act 304c of determining a diversity metric associated with the layout chromosome 202. As discussed above, the diversity metric reflects the coverage and balance of the digital content fragments in a layout chromosome.

For example, as shown in FIG. 3A, a digital content fragment (e.g., the digital content fragments 204a, 204l, 204m, and 204b) is associated with various attributes. For example, attributes of the digital content fragment can include a digital content fragment topic (e.g., "Camping," "Shoes," "Puppies," and "Zoo") and a digital content fragment type (e.g., digital image or digital video). The digital content fragment can include a variety of other attributes, such as color, shape, size range, duration, tone (or any other feature that a designer seeks to cover or vary with a digital layout). In one or more embodiments, the digital layout design system 102 automatically detects the attributes of digital content fragments. In other embodiments, the developer client device 108 can provide attributes of the digital content fragments.

In one or more embodiments, the digital layout design system 102 generates a diversity metric (e.g., coverage metric and/or balance metric) that indicates the extent to which the attributes of the subset of digital content fragments in the layout chromosome 202 are representative (e.g., cover and/or are balanced between) the attributes of the larger candidate set of digital content fragments.

In at least one embodiment, the coverage metric reflects the extent to which important attributes of the candidate set of digital content fragments are represented within the subset of digital content fragments that make up the layout chromosome 202. For example, the digital layout design system 102 can define the coverage metric according to the following:

$$\frac{\sum_{i \in \mathcal{L}} \sum_{a \in \mathcal{A}} x_{ia}}{|\mathcal{L}||\mathcal{A}|}$$

Where $\mathcal{A}$ is the set of attributes a represented in the larger candidate set of digital content fragments, $\mathcal{L}$ is the subset of digital content fragments i in the layout chromosome, and $x_{ia}$ is the weight for an attribute a to digital content fragment i.

Additionally, in at least one embodiment, the balance metric reflects an extent to which all attributes in the larger candidate set of digital content fragments are represented in the subset of digital content fragments in the layout chromosome 202. For example, the digital layout design system 102 can define the balance metric according to the following:

$$\sum_{a \in \mathcal{A}} \left( \frac{\sum_{i \in \mathbb{C}} x_{ia}}{|\mathbb{C}|} - \frac{\sum_{i \in \mathcal{L}} x_{ia}}{|\mathcal{L}|} \right)$$

Where $\mathcal{A}$ is the set of attributes a represented in the larger candidate set $\mathbb{C}$ of digital content fragments i, $\mathcal{L}$ is the subset of digital content fragments i in the layout chromosome, and $x_{ia}$ is the weight for an attribute a to digital content fragment i.

In one or more embodiments, the weights $x_{ia}$ are determined (or set) by the digital layout design system 102. In some embodiments, the weights $x_{ia}$ are adjustable parameters that the developer 120 can set and/or adjust (via the developer client device 108). For instance, the developer 120 can choose to emphasize diversity of topics over diversity of different digital content types (or vice versa) by modifying the weights $x_{i_a}$. In some embodiments, the developer 120 can select a first set of weights for attributes in calculating the coverage metric and a second set of weights for attributes in calculating the balance metric.

After determining the coverage metric and the balance metric associated with the layout chromosome 202, the digital layout design system 102 can perform the act 304c of determining the diversity metric for the layout chromosome 202 as a function of the coverage and balance metrics. For example, the digital layout design system 102 can determine the diversity metric for the layout chromosome 202 by totaling the coverage and balance metrics, determining a weighted average of the coverage and balance metrics, by multiplying the coverage and balance metrics or by applying some other function to the coverage and balance metrics.

As mentioned above, after performing the acts 304a, 304b, and 304c of determining a contribution metric, a relevance metric, and a diversity metric associated with the layout chromosome 202, the digital layout design system 102 can utilize these metrics to compute an overall fitness level for the layout chromosome 202. For example, the digital layout design system 102 can utilizes the contribution, relevance, and diversity metrics in connection with a monotonic function with a corresponding weight for each metric. The resulting fitness level reflects the quality of the layout chromosome 202 relative to a distribution audience and one or more optimization goals specified by the developer 120.

As mentioned above, upon computing the fitness level of the layout chromosome 202, the digital layout design system 102 can explore other layout chromosome possibilities. For instance, as shown in FIG. 3A, the digital layout design system 102 performs the act 306 of mutating the layout chromosome 202. In particular, the digital layout design system performs the act 306 by performing at least one of the acts 306a-306c accordingly to probabilities $P_1$, $P_2$, and $P_3$.

For example, one way that the digital layout design system 102 mutates the layout chromosome 202 is by performing the act 306a of modifying a size of a digital content fragment in the layout chromosome 202. In one or more embodiments, the digital layout design system 102 modifies a size of a digital content fragment in the layout chromosome 202 by selecting a digital content fragment from digital content fragments in the layout chromosome based on one or more performance metrics. For instance, the digital layout design system 102 can select a digital content fragment from a set of top performing digital content performance metrics in the layout chromosome. To illustrate, the digital layout design system 102 can sample from a set of digital content fragment in a top percentile (e.g., top twentieth percentile) or a top number (e.g., top 5) of the digital content fragments in the layout chromosome.

After selecting a digital content fragment, the digital layout design system 102 identifies size-variants of the selected digital content fragment. For instance, the digital layout design system 102 can identify size-variants based on a comparison of performance metric and cost (e.g., size). To illustrate, in relation to the act 306a of FIG. 3, the digital layout design system 102 identifies size-variants that satisfy:

performance metric/cost>Ω, where the cost is the size of the digital content fragment variant and n is a threshold (e.g., a threshold configured manually by the developer 120 or configured automatically by the digital layout design system 102).

In one or more embodiments, the digital layout design system 102 identifies those size-variants that satisfy percentage metric/cost>Ω and then select a single size variant based on cost (e.g., size). Specifically, in one or more embodiments, the digital layout design system 102 selects a size-variant that satisfies percentage metric/cost>Ω and has a maximum cost (e.g., size).

Upon identifying a size-variant for a digital content fragment, the digital layout design system 102 modifies the size of the digital content fragment to the size of the identified size-variant. For example, as shown in FIG. 3B, the size of the digital content fragment 204a changes. In at least one embodiment, modifying the size of a digital content fragment in this manner ensures that promising (e.g., top-performing) digital content fragments in the layout chromosome 202 are given a larger share of the resulting digital layout.

As discussed above, the digital layout design system 102 can also mutate the layout chromosome 202 by modifying ranking within a layout chromosome. For example, FIG. 3B illustrates the digital layout design system 102 performing the act 306b of modifying the ranking (or order) of digital content fragments within the layout chromosome 202. In particular, the digital layout design system 102 modifies the ranking of digital content fragments within the layout chromosome 202 by selecting two digital content fragments within the layout chromosome 202, then swapping the positions of the selected digital content fragments within the layout chromosome 202.

The digital layout design system 102 can select digital content fragments to swap in a variety of ways. For example, the digital layout design system 102 can randomly identify the two digital content fragments (e.g., based on a random number generator). Alternatively, the digital layout design system 102 can track previously swapped positions in order to evenly address all positions within the layout chromosome 202 over multiple mutation iterations. For example, as shown in FIG. 3B, the digital layout design system 102 can modify the ranking of the digital content fragments (e.g., indicated as 1, 2, 3, . . . ) in the layout chromosome 202' by swapping the position of two digital content fragments to result in the layout chromosome 202". In one or more embodiments, changing positions of digital content fragments within the layout chromosome 202 impacts the placement regions of the digital content fragments in the final digital layout.

As mentioned, the digital layout design system 102 can also mutate the layout chromosome 202 by replacing digital content fragments. For example, as shown in FIG. 3B, the digital layout design system 102 performs the act 306c of replacing a digital content fragment in the layout chromosome 202 with a digital content fragment in the larger candidate set of digital content fragments. For example, the digital layout design system 102 can randomly select a first digital content fragment in the layout chromosome and randomly select a second digital content fragment from the candidate set and swap the first digital content fragment with the second digital content fragment. For instance, as shown in FIG. 3B, the digital layout design system 102 replaces a digital content fragment (e.g., indicated as "3") in the layout chromosome 202' with a digital content fragment from the candidate set (e.g., indicated as "8") to generate the layout chromosome 202".

Although the foregoing example describes randomly selecting the first and second digital content fragments, the digital layout design system 102 can select the first and second digital content fragments based on other factors, such as performance metrics, size, topic, theme, digital content type, or replacement selections in previous iterations. For example, in one or more embodiments, the digital layout design system 102 randomly selects the digital content fragment in the layout chromosome 202 and then selects the digital content fragment from the candidate set with the highest performance metric.

Alternatively, the digital layout design system 102 can identify a digital content fragment in the layout chromosome 202 that has not previously been replaced and a digital content fragment in the candidate set that has not previously been part of the layout chromosome 202. In one or more embodiments, replacing digital content fragments in this manner provides an opportunity for digital content fragments with low or no performance metrics to be potentially be included in the layout chromosome 202, and eventually in the final digital layout.

In relation to the embodiment of FIG. 3B, the digital layout design system 102 performs one type of mutation in each iteration. In one or more embodiments, the digital layout design system 102 determines which type of mutation to perform based on predetermined probabilities. For instance, as illustrated in FIG. 3B, the digital layout design system 102 performs: the act 306a with a probability $P_1$, the act 306b with a probability $P_2$, and the act 306c with a probability $P_3$. Specifically, the digital layout design system 102 selects which mutation to perform by sampling according to the probabilities $P_1$, $P_2$, and $P_3$.

For example, the digital layout design system 102 may utilize $P_1=0.3$, $P_2=0.6$, and $P_3=0.1$. Thus, under these probabilities, the digital layout design system 102 is most likely to perform the mutation act 306b (i.e., sampling at a 60% rate) for any given iteration. Similarly, the digital layout design system 102 is least likely to perform the mutation act 306c (i.e., sampling at a 10% rate) for any given iteration. In at least one embodiment, the developer 120 can manually configure the probabilities $P_1$, $P_2$, and $P_3$. In other embodiments the probabilities are selected by the digital layout design system 102.

As shown in FIG. 3B, after mutating the layout chromosome 202, the digital layout design system 102 performs the act 308 of decoding the layout chromosome 202 utilizing region importance metrics. As mentioned above, region importance metrics indicate viewer salience of regions in a digital layout. For example, as shown in FIG. 3B, the digital layout design system 102 can overlay region importance metrics (e.g., indicated as 1, 2, 3, 4, 5, 6) over a digital layout template 208 associated with the layout chromosome 202. Thus, the region of the digital layout template 208 associated with the region importance metric "1" is the most important region of the digital layout template 208.

The digital layout design system 102 decodes the layout chromosome 202 by identifying an empty (e.g., non-assigned) region of the digital layout template 208 with the highest level of importance as indicated by the overlaid region importance metrics. In one or more embodiments, the digital layout design system 102 determines a size of the identified region and then identifies a highest ranked digital content fragment in the layout chromosome 202 with a size variant that corresponds to the size of the identified region. The digital layout design system 102 assigns the size variant of the identified digital content fragment to the empty region in the digital layout template 208. In at least one embodiment, the digital layout design system 102 continues this process until either all of the regions in the digital layout template 208 are assigned, or until no digital content fragments remain in the layout chromosome 202.

Utilizing the approach illustrated in FIGS. 3A-3B, the digital layout design system 102 can generate digital layouts specific to particular platforms/devices, audiences, channels, or optimization goals (e.g., optimization of particular performance metrics). For instance, the digital layout design system 102 can generate different digital layouts for particular platforms/devices by applying the approach illustrated in FIGS. 3A-3B to different digital layout templates. To illustrate, the digital layout design system 102 can access (or generate) a first digital layout template for a first device type (e.g., a smartphone) and a second digital layout template for a second device type (e.g., a laptop). The digital layout design system 102 can perform the acts 302-308 in relation to the first digital layout template and the second digital layout template and automatically generate two different layouts tailored to the particular device types. Thus, a developer can select multiple different platforms (via one or more user interface elements) and the digital layout design system 102 can automatically generate digital layouts for the different platforms.

Similarly, the digital layout design system can generate different digital layouts for particular audiences, distribution channels, or optimization goals. For instance, the digital layout design system can generate different layouts for different audiences, channels, or metrics by applying the approach illustrated in FIGS. 3A-3B to different groups of performance metrics. In particular, the digital layout design system can identify performance metrics specific to an audience, channel, and/or goal and utilize those performance metrics to guide selection and arrangement of the digital layout.

To illustrate, the digital layout design system 102 can access a first set of performance metrics for digital content fragments specific to clicks by individuals age 30-35 year old. The digital layout design system 102 access a second set of performance metrics for digital content fragments specific to views by individuals age 12-15 year old. The digital layout design system 102 can analyze the first set of performance metrics and automatically generate a digital layout for individuals age 30-35 years old and optimized for clicks. Similarly, the digital layout design system 102 can analyze the second set of performance metrics and automatically generate a digital layout for individuals age 12-15 year old and optimized for views. Thus, a developer can select various audiences or performance metrics (via one or more user interface elements) and the digital layout design system 102 can automatically generate digital layouts for the different audiences or performance metrics.

Figure 4:
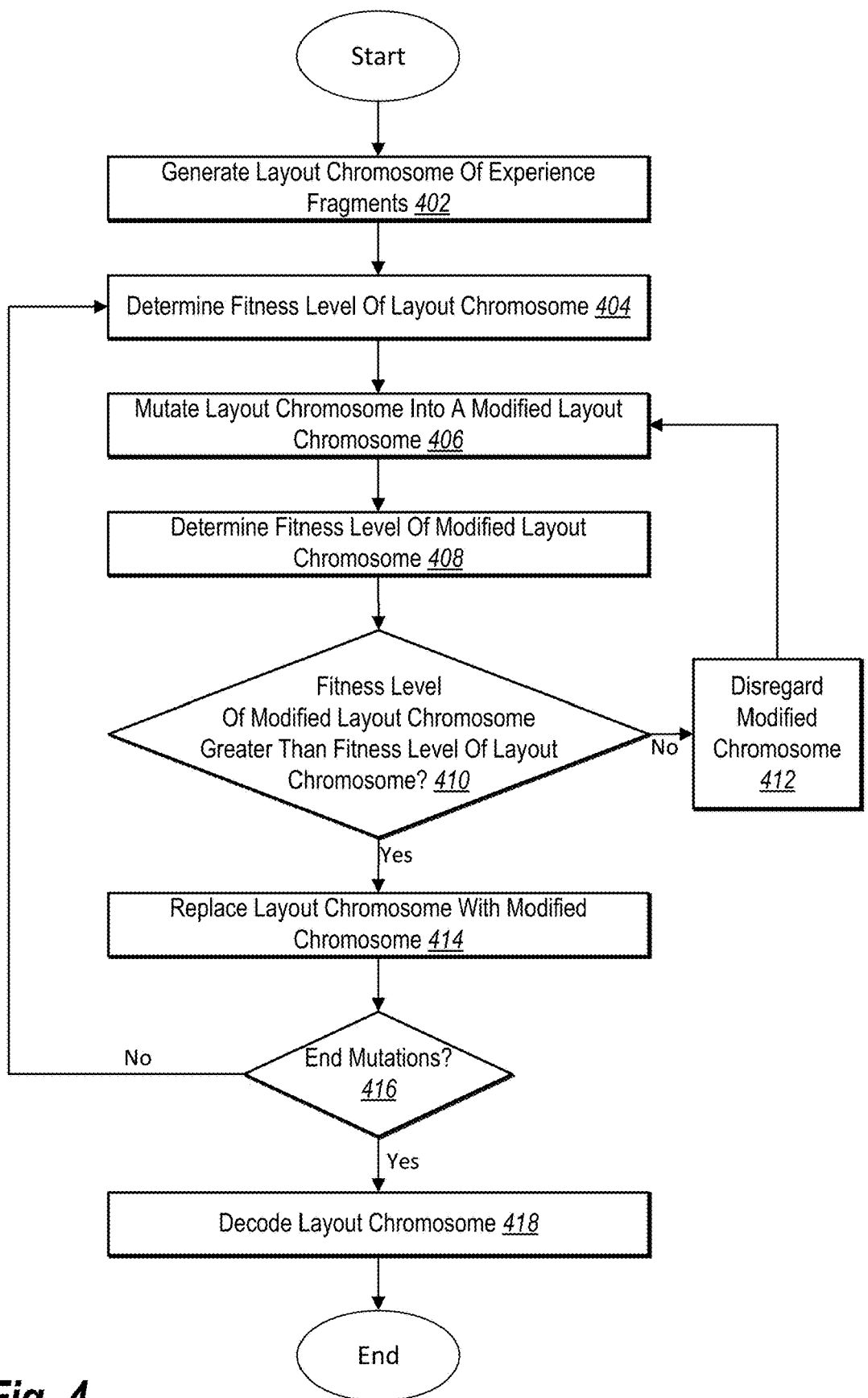
FIG. 4 illustrates a sequence diagram of iteratively mutating a layout chromosome in accordance with one or more embodiments.

FIG. 4 illustrates additional detail with regard to an iterative process for generating enhanced digital layouts in accordance with one or more embodiments. For example, as shown in FIG. 4, the iterative process begins when the digital layout design system 102 performs the act 402 of generating a layout chromosome of digital content fragments. As described above, in one or more embodiments, the digital layout design system 102 generates a layout chromosome by identifying a subset of a larger candidate set of digital content fragments that are associated with the highest or best performance metrics.

After generating the layout chromosome, the digital layout design system 102 begins a fitness level and mutation loop. As shown in FIG. 4, the digital layout design system 102 performs the act 404 of determining a fitness level of the digital layout. For example, as laid out above, in one or more embodiments, the digital layout design system 102 determines the fitness level of the digital layout by computing a contribution metric, a relevance metric, and a diversity metric associated with the layout chromosome and the digital layout.

As discussed above, certain metrics (e.g., the contribution metric) are based on an analysis of the digital content fragments positioned in a digital layout. Accordingly, in at least one embodiment, prior to determining a fitness level of the layout chromosome, the digital layout design system 102 decodes the layout chromosome into a digital layout (e.g., as described at the act 308).

After determining the fitness level of the layout chromosome in the act 404, the digital layout design system 102 performs the act 406 of mutating the layout chromosome into a modified layout chromosome. As discussed above, the digital layout design system 102 can mutate the layout chromosome in one of a variety of ways. For example, the digital layout design system 102 can vary a size of a digital content fragment in the layout chromosome, exchange a position of a first digital content fragment with a position of a second digital content fragment within the layout chromosome, or replace a digital content fragment in the layout chromosome with a digital content fragment from the candidate set of digital content fragments that are not currently in the layout chromosome. In one or more embodiments, the digital layout design system 102 determines which of these mutations to perform in a given iteration based on predetermined probabilities. In at least one embodiment, the result is the modified layout chromosome.

In one or more embodiments, the digital layout design system 102 applies mutations of different magnitudes or extents (often called "temperatures") at different iterations. For example, in one or more embodiments, the digital layout design system 102 mutates the size of a digital content fragment utilizing a first temperature (e.g., by a first magnitude) at a first iteration. The digital layout design system 102 can then modify the size of a digital content fragment utilizing a second temperature (e.g., by a second magnitude) at a second iteration. In one or more embodiments, the digital layout design system 102 reduces the temperature (e.g., reduces the magnitude or extent) of mutations at each iteration.

Next, the digital layout design system 102 performs the act 408 of determining the fitness level of the modified layout chromosome. In one or more embodiments, the digital layout design system 102 determines the fitness level of the modified layout chromosome in the same manner as described above with reference to the first layout chromosome. For example, the digital layout design system 102 computes the fitness level of the modified layout chromosome based on a contribution metric, a relevance metric, and a diversity metric associated with the modified layout chromosome. In at least one embodiment, the digital layout design system 102 may decode the modified layout chromosome into a digital layout in order to determine one or more of the metrics that contribute to the fitness level of the modified layout chromosome.

With a computed fitness level of the first layout chromosome and a computed fitness level of the modified layout chromosome, the digital layout design system 102 performs the act 410 of determining which fitness level is greater. For example, in order to generate a layout chromosome with a peak fitness level over multiple iterations, the digital layout design system 102 operates under a heuristic dictating that the fitness level of the current first layout chromosome improves from one iteration to the next. Accordingly, in the act 410, the digital layout design system 102 determines whether the fitness level of the modified layout chromosome is greater than the fitness level of the first layout chromosome.

If the fitness level of the modified layout chromosome is not greater than the fitness level of the first layout chromosome (e.g., "No"), the digital layout design system 102 performs the act 412 of disregarding the modified layout chromosome. For example, as shown in FIG. 4, after disregarding the modified layout chromosome (e.g., the mutated first layout chromosome), the digital layout design system 102 performs the act 406 to again mutate the layout chromosome into a new modified layout chromosome.

If the fitness level of the modified layout chromosome is greater than the fitness level of the layout chromosome in the act 410 (e.g., "Yes"), the digital layout design system 102 performs the act 414 of replacing the layout chromosome with the modified layout chromosome. Thus, at this point, the layout chromosome becomes the modified layout chromosome. In this manner, the first layout chromosome mutates over multiple iterations, while its fitness level improves with each iteration.

As shown, the digital layout design system 102 also performs the act 416 of determining whether to end the mutations to the layout chromosome. In at least one embodiment, the digital layout design system 102 can determine to end mutation iterations when the performance level of the first layout chromosome stabilizes to a threshold level. For example, the digital layout design system 102 can determine that the performance level has stabilized when the fitness level comparison in the act 410 indicates that the fitness level of the modified layout chromosome is only greater than the fitness level of the first layout chromosome by less than a threshold amount. Additionally, the digital layout design system 102 can determine that the performance level has stabilized when the fitness level of the modified layout chromosome is greater than the fitness level of the layout chromosome by less than a threshold amount for a predetermined number of iterations.

Alternatively, the digital layout design system 102 may end the mutation process in the act 416 in response to determining that a threshold number of iterations have occurred. For example, the digital layout design system 102 can track the number of mutation iterations that occur, and end the mutation process when that number reaches a threshold amount. In at least one embodiment, the digital layout design system 102 may only end the mutation process when the first layout chromosome has been mutated through thousands of iterations.

As shown, the digital layout design system 102 also performs the act 418 of decoding the first layout chromosome. For example, as described above, the digital layout design system 102 decodes the first layout chromosome by utilizing a digital layout template with one or more weighted regions, where the weights correspond to a region importance metric. As will be described in greater detail below, the digital layout design system 102 decodes the first layout chromosome by identifying the size of a region with the heaviest weight in the digital layout template, and assigning a highest ranked digital content fragment with a corresponding size from the first layout chromosome to the identified region. The digital layout design system 102 repeats this process until all the regions in the digital layout template are assigned a digital content fragment, or until no digital content fragments remain in the first layout chromosome.

In addition to the foregoing description, embodiments of the digital layout design system 102 can also be described in terms of algorithms or pseudocode that cause a computing device to perform certain acts. For example, Algorithm 1 illustrates pseudocode implemented by the digital layout design system 102 in accordance with one or more embodiments:

---

ALGORITHM 1

```
Input: <set of fragments>, optimization goal-to-optimize, GridSize
Layout = Chromosome(<set of fragments>, KPI-to-optimize, GridSize);
Layout.fitness = computeFitness(Layout);
initTemperature = -10/ log(0.8);
minTemperature = initTemperature/(NUMGENERATIONS + 1);
curGeneration = 0;
do:
    tempLayout = mutate(Layout)
    tempLayout.fitness = computeFitness(tempLayout)
    if:
        (tempLayout.fitness-Layout.fitness)>0 OR
        RandomNumber < e^(delta/curTemperature),
            Layout = tempLayout
    curTemperature = initTemperature / (temperatureDecay + 1);
    temperatureDecay=temperatureDecay+1;
    curGeneration++;
    if (curGeneration>NUMGENERATIONS)
    break
LOOP
return (decode(Layout))
```

---

Figure 5:
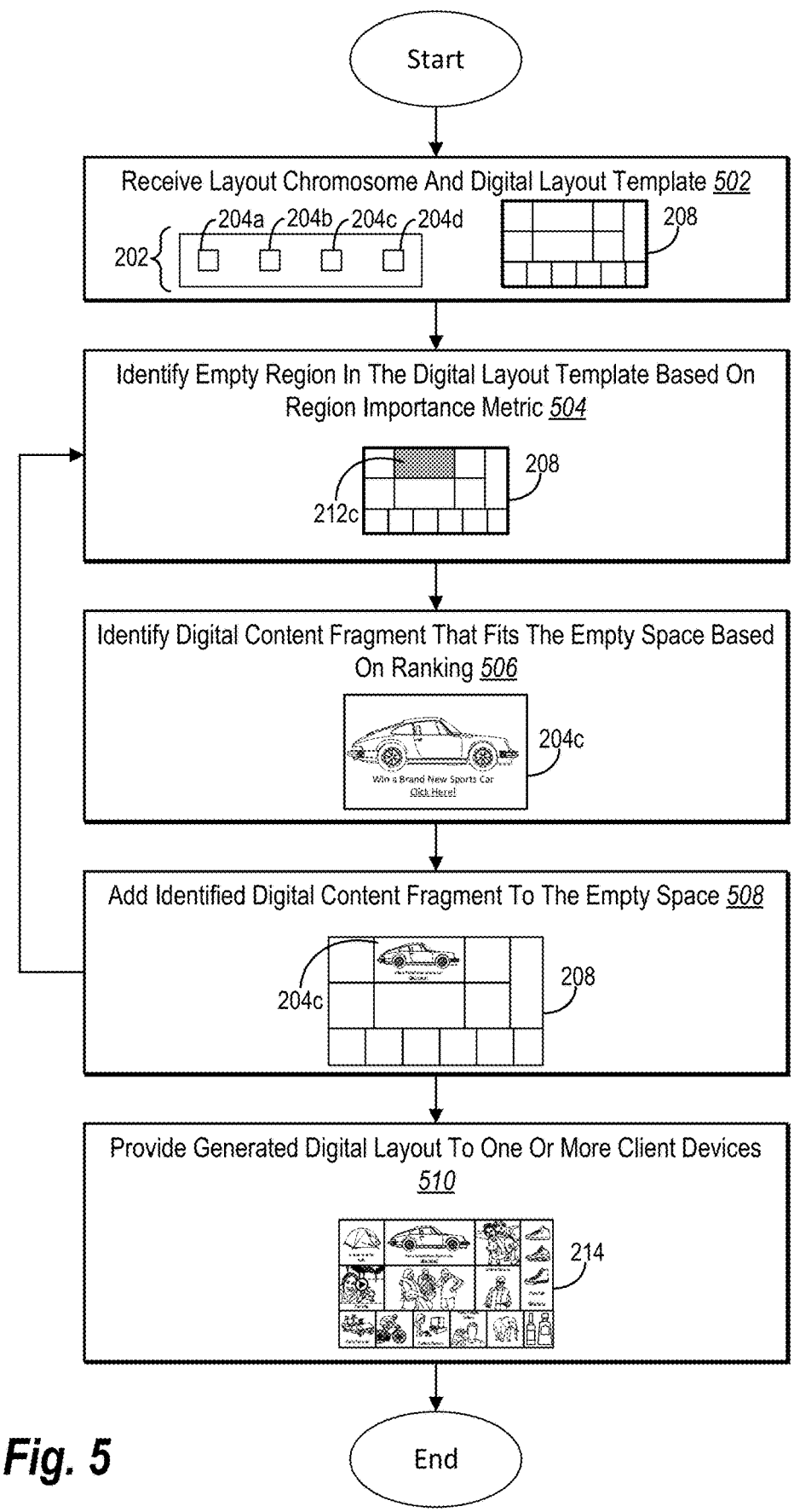
FIG. 5 illustrates a sequence diagram of decoding a layout chromosome into a digital layout in accordance with one or more embodiments.

FIG. 5 illustrates additional details related to how the digital layout design system 102 decodes a layout chromosome into a digital layout. For example, as shown in FIG. 5, the digital layout design system 102 begins the decoding process by performing the act 502 of receiving a layout chromosome and an associated digital layout template. As shown in FIG. 5, the layout chromosome 202 includes an ordered ranking of digital content fragments 204a, 204b, 204c, and 204d. Additionally, the digital layout template 208 includes multiple regions, each with a position and size.

The digital layout design system 102 then performs the act 504 of identifying an empty region in the digital layout template based on a region importance metric. As discussed above, the digital layout design system 102 can identify important regions of the digital layout template based on region importance metrics overlaid on the digital layout template. For example, the digital layout design system 102 determines region importance metrics to overlay on the digital layout template based on an exponential decay function that models display areas that are most likely to receive user attention. Thus, as shown in FIG. 5, the region 212c in the digital layout template 208 may be associated with the highest importance level because of its size and location near the top-right of the layout.

After identifying the most important region in the digital layout template 208 with no assigned digital content fragment, the digital layout design system 102 performs the act 506 of identifying a highest ranked digital content fragment that fits the identified most important region. As discussed above, the position of a digital content fragment within a layout chromosome indicates the rank of the digital content fragment. Thus, in at least one embodiment, a digital content fragment positioned at the front of a layout chromosome is ranked higher than a digital content fragment positioned at the back of the layout chromosome.

The digital layout design system 102 identifies the highest ranked digital content fragment that fits the identified most important region by identifying a digital content fragment with the highest position in the layout chromosome that either has a size that corresponds to the most important region, or is associated with a size variation that corresponds to the most important region. As shown in FIG. 5, the digital content fragment in the layout chromosome that satisfies this criterion may not be the highest ranked digital content fragment (e.g., the digital content fragment 204a) in the layout chromosome 202. Instead, as shown, the highest ranked digital content fragment that satisfies the criteria discussed above is the digital content fragment 204c.

In response to performing the act 506, the digital layout design system 102 performs the act 508 of adding the identified digital content fragment to the identified empty region in the digital layout template. For example, the digital layout design system 102 can add the identified digital content fragment by copying the size-correlated version of the digital content fragment into the empty region in the digital layout template. Alternatively, the digital layout design system 102 can associate the digital content fragment with the empty region in the digital layout template by adding a pointer to the empty region that points to a memory position associated with the digital content fragment.

In one or more embodiments, the digital layout design system 102 iteratively loops through the acts 504, 506, and 508 until one of various criteria is satisfied. For example, the digital layout design system 102 may iteratively loop through the acts 504, 506, and 508 until there are no remaining empty regions in the digital layout template 208. Alternatively or additionally, the digital layout design system 102 may iteratively loop through the acts 504, 506, and 508 until all of the digital content fragments in the layout chromosome 202 are added to the digital layout template 208.

Accordingly, in one or more embodiments, the digital layout design system 102 fills up the digital layout as soon as possible (or in the minimum number of steps), thus optimizing the arrangement of the digital content fragments based on the ranking. Accordingly, the digital layout design system can pick digital content fragments from the layout chromosome in a manner as to optimize the digital layout space occupied by the digital content fragment along with the reward (assigned weight for performance metrics) achieved.

Additional detail regarding greedy approaches for arrangement of pre-selected items to locations (e.g., bin packing approaches) is provided by E. G. Coffman, Jr., M. R. Garey, and D. S. Johnson, *Approximation algorithms for bin packing: a survey*, APPROXIMATION ALGORITHMS FOR NP-HARD PROBLEMS, 46-93 (1996), which is incorporated herein by reference. This approach, in theory, is NP-hard. Accordingly, in one or more embodiments, the digital layout design system 102 extends the complete bounding box-based strategy using a first fit decreasing algorithm, as described in Huang and Korf, *Optimal rectangle packing: an absolute placement approach*, JAIR (2013), which is incorporated herein by reference in its entirety. In this manner, the digital layout design system 102 can iteratively create an updated layout (bin dimension) and an updated digital content fragment list (list of all digital content fragment variants that have not been placed on the layout) until the point all locations on the digital layout have been filled up. This approach can thus fill up the layout (achieve the target layout) with the key digital content fragments in the smallest number of iterations.

After one or more iteration criteria are satisfied, the digital layout design system 102 performs the act 510 of providing the generated digital layout to one or more audience members. In one or more embodiments, the digital layout design system 102 provides the generated final digital layout 214 within a web page for display via one or more web browsers (e.g., the web browsers 118a-118c installed on the client devices 116a-116c). In at least one embodiment, the digital layout design system 102 provides the generated final digital layout 214 to audience members based on configurations and other demographic information provided by the developer 120. Alternatively, the digital layout design system 102 can provide the generated final digital layout 214 to the developer client device 108 for future distribution.

It should be noted that the first fit decreasing algorithm described above allows the digital layout design system 102 to perform offline arrangement of digital content fragments (e.g., separate from and without communication to a computing device implementing mutations or fitness level determinations). For example, once digital content fragment variants are available, they can be sorted offline based on the ranking criteria and the arrangement strategy is then independent of the sorting or the ranking. Because the layout chromosome provides a permutation (and an ordering) of the digital content fragments, the digital layout design system 102 can use the ranked list.

Note also, that decoding can operated off of salient regions of the content layout along with their combined white spaces. Accordingly, this approach is generalizable to any layout.

Moreover, based on the disclosure above, it is apparent that decoding can be a highly discontinuous operation. In particular, making a minor alteration in a layout chromosome via a mutation potentially alters the fitness of the resulting layout in non-trivial ways. This can make it difficult to invoke standard optimization procedures to generate the best layout. The proposed genetic algorithm framework is extremely general because it allows the fitness determination to be made in a "black box," and decoding places the key digital content fragments in key locations within the digital layout.

Figure 6:
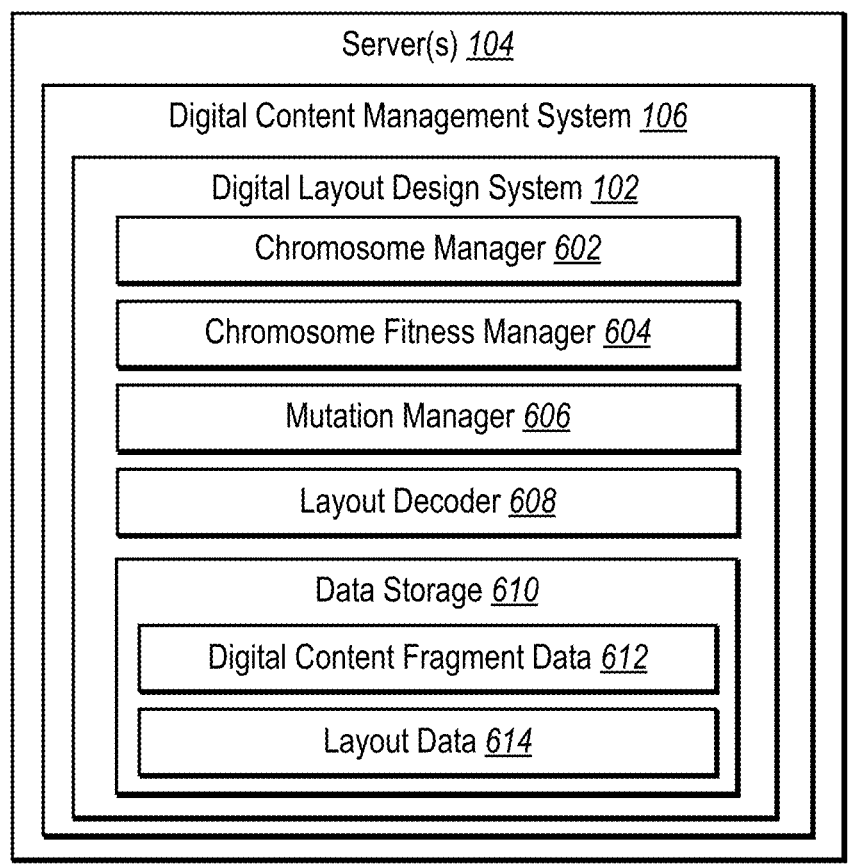
FIG. 6 illustrates a schematic diagram of the digital layout design system in accordance with one or more embodiments.

FIG. 6 illustrates example components of the digital layout design system 102 in accordance with one or more embodiments. For example, as shown in FIG. 6, the digital layout design system 102 is implemented by the digital content management system 106 on the server(s) 104. Although illustrated on the server(s) 104, as mentioned above, the digital layout design system 102 can be implemented by another computing device (e.g., the developer client device 108). In one or more embodiments, the digital layout design system 102 includes a chromosome manager 602, a chromosome fitness manager 604, a mutation manager 606, a layout decoder 608, and a data storage 610 including digital content fragment data 612 and layout data 614.

In one or more embodiments, the components 602-610 comprise software, hardware, or both. For example, the components 602-610 can comprise computing instructions stored on a non-transitory computer-readable storage medium and executable by the server(s) 104. When executed by the at least one processor, the computer-executable instructions cause the server(s) 104 to perform the methods and processes described herein. Alternatively, the components 602-610 can comprise hardware, such as a special purpose processing device to perform a certain function or group of functions. Additionally, the components 602-610 can comprise a combination of computer-executable instructions and hardware.

As mentioned above, and as shown in FIG. 6, the digital layout design system 102 includes a chromosome manager 602. In one or more embodiments, the chromosome manager 602 generates a layout chromosome in response to a received request for an enhanced digital layout. For example, the digital layout design system 102 can receive a developer request (e.g., via the digital layout design system application 110 installed on the developer client device 108) that includes demographic information for a distribution audience, a digital layout template, and one or more digital content fragments. Utilizing the information associated with the request, the chromosome manager 602 generates a layout chromosome by identifying a subset of the one or more digital content fragments based on performance metrics associated with each digital content fragment. As discussed above, the chromosome manager 602 determines the number of digital content fragments in the subset based on the number of regions in the digital layout template. The chromosome manager 602 can also determine a ranking of the digital content fragments in the layout chromosome (e.g., based on the performance metrics for each digital content fragment).

As further shown in FIG. 6, the digital layout design system 102 includes a chromosome fitness manager 604. In one or more embodiments, the chromosome fitness manager 604 determines a fitness level of a layout chromosome based on various metrics. As discussed above, in order to determine the fitness level of a layout chromosome, the chromosome fitness manager 604 computes a contribution metric, a relevance metric, and/or a diversity metric. In additional or alternative embodiments, the chromosome fitness manager 604 can determine the fitness level of a layout chromosome based on additional or alternative metrics.

As mentioned above, and as shown in FIG. 6, the digital layout design system 102 includes a mutation manager 606. In one or more embodiments, the mutation manager 606 mutates a layout chromosome in one of various ways in each iteration of the cycle (e.g., described above with reference to FIGS. 2A, 3B, 4). For example, in every iteration, the mutation manager 606 can mutate a layout chromosome by varying a size of a digital content fragment in the layout chromosome, by exchanging a position of a first digital content fragment with a position of a second digital content fragment within the layout chromosome, or by replacing a digital content fragment in the layout chromosome with a digital content fragment from one or more digital content fragments not currently in the layout chromosome. As discussed above, the mutation manager 606 can perform these mutations according to certain probabilities.

Additionally, as shown in FIG. 6, the digital layout design system 102 includes a layout decoder 608. In one or more embodiments, the layout decoder 608 utilizes the greedy approach described above with reference to FIG. 5 to decode a layout chromosome into a digital layout. For example, the layout decoder 608 assigns the highest ranking and best-fit digital content fragment to the most important region in a digital layout template in an iterative manner until all the regions in the digital layout template are assigned or until the layout chromosome is empty. In at least one embodiment, as discussed above, the layout decoder 608 utilizes an exponential decay function in connection with observed user behavior to determine a level of importance for each region in the digital layout template. Alternatively, the layout decoder 608 may utilize preconfigured importance levels (e.g., provided by the developer 120), or may utilize machine learning to determine importance levels of regions of the digital image template.

Also, as mentioned above, the digital layout design system 102 includes a data storage 610. The data storage 610 stores and maintains digital content fragment data 612 representative of digital content fragment information, such as described herein. The data storage 610 also stores and maintains layout data 614 representative of digital layout information, such as described herein.

Figure 7:
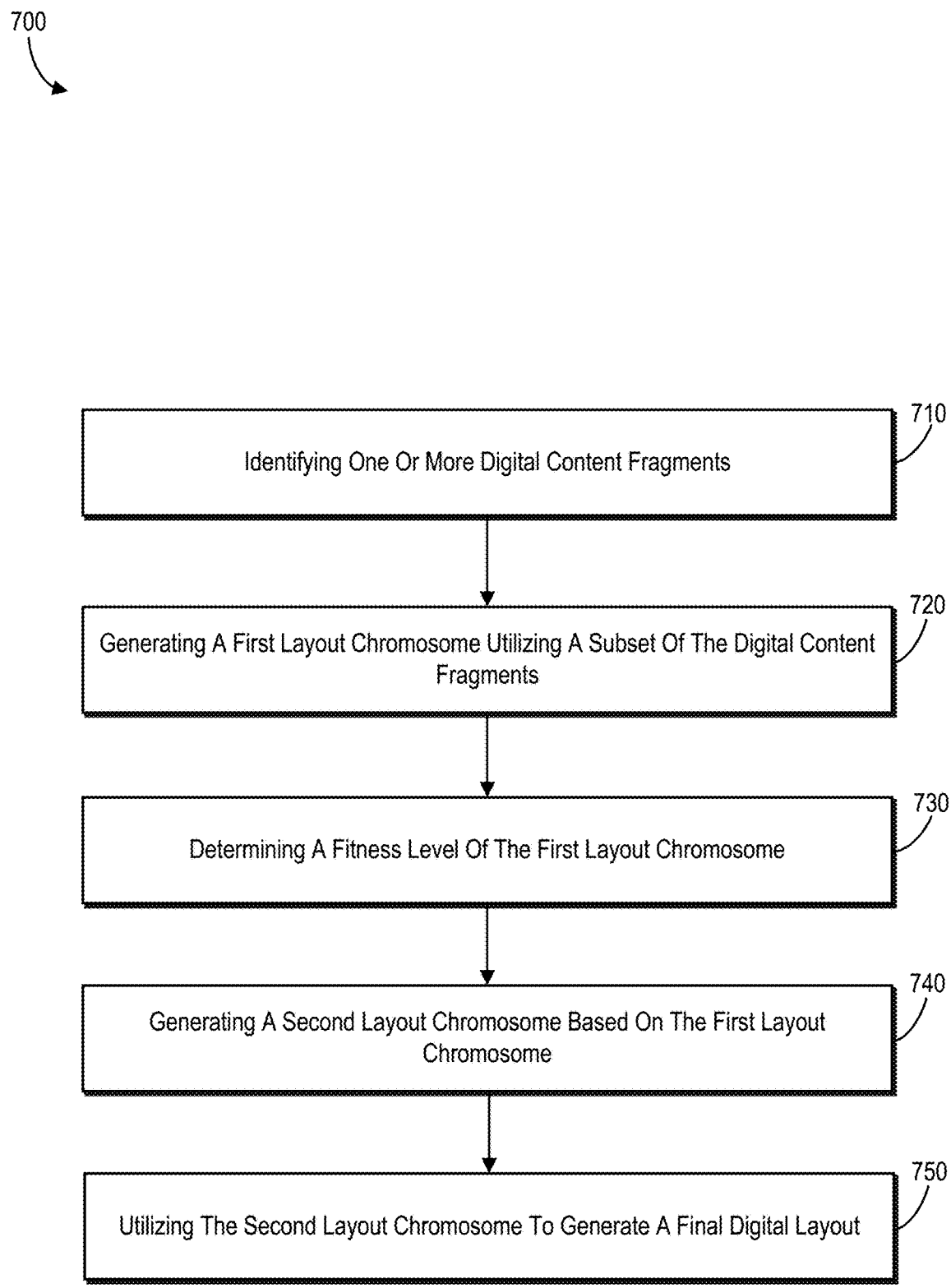
FIG. 7 illustrates a flowchart of a series of acts for generating an enhanced digital layout in accordance with one or more embodiments.

Turning now to FIG. 7, this figure illustrates a flowchart of a series of acts 700 for generating an enhanced digital layout in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions, that when executed by one or more processors, cause a computing device to perform the acts of FIG. 7. In still further embodiments, a system can perform the acts of FIG. 7.

As shown in FIG. 7, the series of acts 700 includes an act 710 of identifying one or more digital content fragments. For example, the act 710 can involve identifying digital content fragments, performance metrics associated with the digital content fragments, and a distribution audience. In one or more embodiments, the identified digital content fragments comprise at least one of a digital image, a digital video, or digital text; and the identified performance metrics comprise at least one of conversions, revenue, click-throughs, or downloads.

Additionally, as shown in FIG. 7, the series of acts 700 includes an act 720 of generating a first layout chromosome including a subset of the digital content fragments. For example, the act 720 can involve generating, based on the performance metrics associated with the digital content fragments, a first layout chromosome comprising a subset of the digital content fragments. In one or more embodiments, generating the first layout chromosome includes: ranking the subset of the digital content fragments in the first layout chromosome based on the identified performance metrics; and selecting a number of digital content fragments in an order based on the ranking, wherein the selected number corresponds to a number of regions in an associated digital layout template, wherein each region in the associated digital layout template comprises a size and position.

Moreover, as shown in FIG. 7, the series of acts 700 includes an act 730 of determining a fitness level of the first layout chromosome. For example, the act 730 can involve determining a first fitness level associated with the first layout chromosome based on the performance metrics of the subset of the digital content fragments and a relevance metric of the subset of the digital content fragments in relation to the distribution audience. In one or more embodiments, determining a first fitness level associated with the first layout chromosome includes: determining, based on the performance metrics of the subset of the digital content fragments in the first layout chromosome and the associated digital layout template, a contribution metric associated with the digital content fragments decoded from the first layout chromosome into a first digital layout; determining a diversity metric associated with the subset of the digital content fragments in the first layout chromosome; and determining the first fitness level based on the contribution metric, the relevance metric, and the diversity metric.

In at least one embodiment, determining the contribution metric associated with the digital content fragments decoded from the first layout chromosome into the first digital layout includes, for each digital content fragment in the first digital layout: determining a region importance metric associated with a position of the digital content fragment in the first digital layout, and weighting the performance metric associated with the digital content fragment based on the determined region importance metric; and determining the contribution metric based on the weighted performance metrics associated with the digital content fragments in the first digital layout.

Additionally, in at least one embodiment, determining the relevance metric associated with the subset of the digital content fragments in the first layout chromosome in relation to the distribution audience includes, for each digital content fragment in the first layout chromosome: determining an individual relevance metric for the digital content fragment based on at least one of: an association between the digital content fragment and the distribution audience or an association between the digital content fragment and one or more topics associated with the associated digital layout template; and determining the relevance metric based on the determined individual relevance metrics for the digital content fragments in the first layout chromosome.

Furthermore, in at least one embodiment, determining a diversity metric associated with the subset of the digital content fragments in the first layout chromosome includes: identifying attributes represented by the identified digital content fragments, wherein the attributes represented by the identified digital content fragments comprise a topic and a content type; determining a coverage metric reflecting combined importance of the attributes of subset of digital content fragments in the first layout chromosome; determining a balance metric reflecting distribution of the attributes of the identified digital content fragments within the subset of the digital content fragments in the first layout chromosome; and determining the diversity metric based on the coverage metric and the balance metric.

As shown in FIG. 7, the series of acts 700 includes an act 740 of generating a second layout chromosome based on the first layout chromosome. For example, the act 740 can involve generating a second layout chromosome by applying a mutation to the first layout chromosome. In one or more embodiments, the series of acts 700 includes an act of applying a mutation to the first layout chromosome by selectively performing one of: varying a size of a digital content fragment in the first layout chromosome; exchanging a position of a first digital content fragment with a position of a second digital content fragment within the first layout chromosome; or replacing a digital content fragment in the first layout chromosome with a digital content fragment from the identified digital content fragments not currently in the first layout chromosome.

In at least one embodiment, the series of acts 700 includes an act of determining the second fitness level associated with the second layout chromosome by: decoding, based on the associated digital layout template, the digital content fragments from the second layout chromosome into a second digital layout; and determining a fitness score associated with the second digital layout based on a contribution metric associated with the second digital layout, a relevance metric associated with the digital content fragments in the second layout chromosome, and a diversity metric associated with the digital content fragments in the second layout chromosome.

Additionally, as shown in FIG. 7, the series of acts 700 includes an act 750 of utilizing the second layout chromosome to generate a final digital layout. For example, the act 750 can involve, based on comparing a second fitness level associated with the second layout chromosome to the first fitness level of the first layout chromosome, utilize the second layout chromosome to generate a final digital layout to provide to client devices of the distribution audience.

Figure 8:
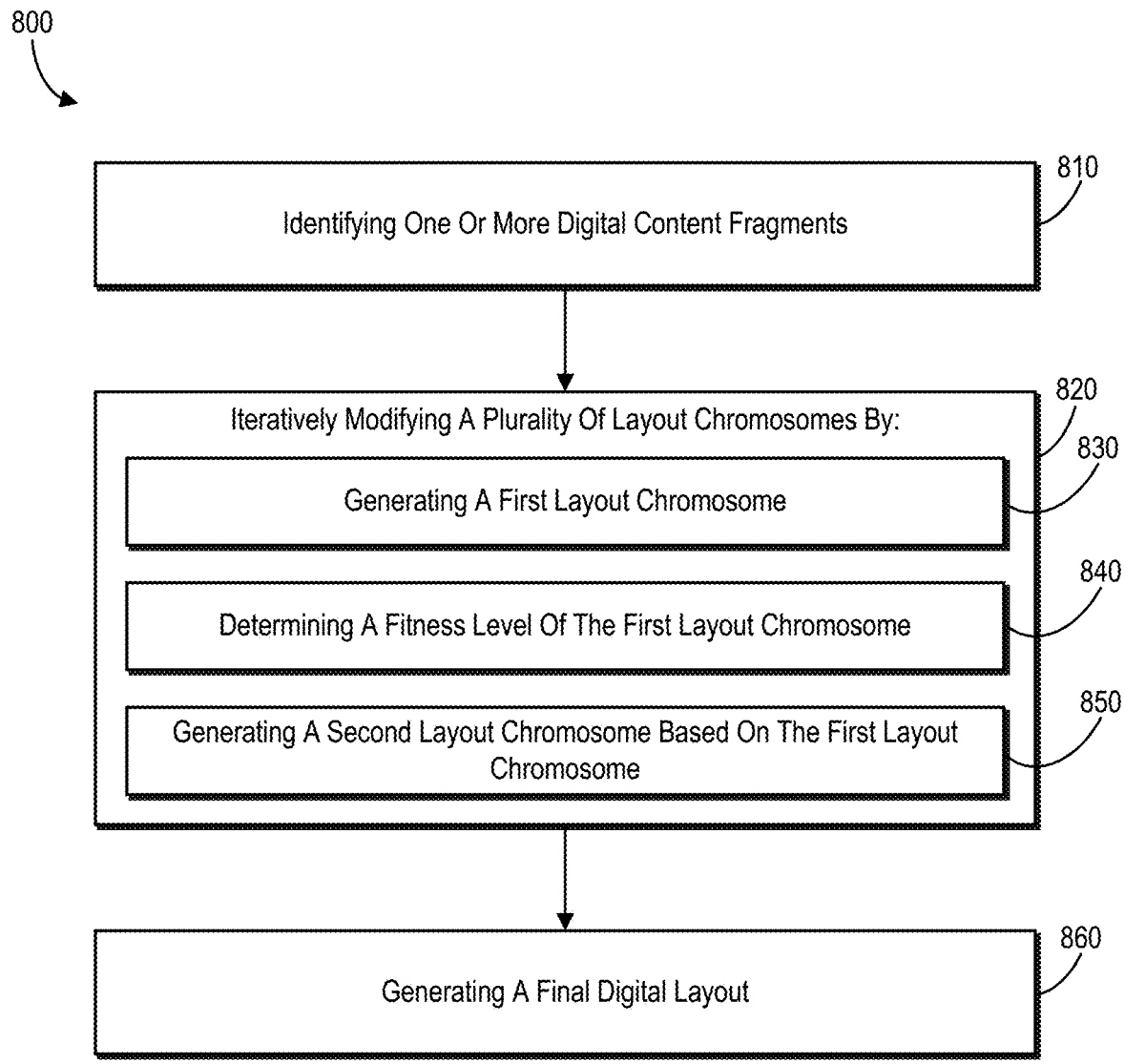
FIG. 8 illustrates a flowchart of another series of acts for generating an enhanced digital layout in accordance with one or more embodiments.

Turning now to FIG. 8, this figure illustrates a flowchart of another series of acts 800 of generating an enhanced digital layout in accordance with one or more embodiments described herein. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further embodiments, a system can perform the acts of FIG. 8.

As shown in FIG. 8, the series of acts 800 includes an act 810 of identifying one or more digital content fragments. For example, the act 810 can involve identifying digital content fragments, performance metrics associated with the digital content fragments, and a distribution audience.

Also as shown in FIG. 8, the series of acts 800 includes an act 820 of iteratively modifying a plurality of layout chromosomes. For example, the act 820 can involve iteratively modifying a plurality of layout chromosomes to generate a final layout chromosome having a final ranking of a final subset of digital content fragments. In one or more embodiments, modifying a plurality of layout chromosomes to generate a final layout chromosome involves the acts 830, 840, and 850, described below.

Furthermore, as shown in FIG. 8, the series of acts 800 includes an act 830 of generating a first layout chromosome. For example, the act 830 can involve generating a first layout chromosome comprising a first ranking of a subset of the digital content fragments. In one or more embodiments, generating the first layout chromosome includes: ranking the subset of the digital content fragments based on the identified performance metrics; and selecting a number of digital content fragments in an order based on the ranking, wherein the selected number corresponds to a number of regions in an associated digital layout template, wherein each region in the associated digital layout template comprises a size and position.

Moreover, as shown in FIG. 8, the series of acts 800 includes an act 840 of determining a fitness level of the first layout chromosome. For example, the act 840 can involve determining a fitness level of the first layout chromosome based on the performance metrics of the subset of the digital content fragments, a relevance metric of the subset of the digital content fragments, and a diversity metric of content of the subset of the digital content fragments.

As shown in FIG. 8, the series of acts 800 includes an act 850 of generating a second layout chromosome based on the first layout chromosome. For example, the act 850 can involve generating a second layout chromosome by applying a mutation to the first layout chromosome, the mutation comprising at least one of: modifying a size of a digital content fragment, replacing a digital content fragment from the subset of the digital content fragments with another digital content fragment, or modifying the ranking. In one or more embodiments, modifying the size of the digital content fragment in the first layout chromosome includes, based on a determination that a digital content fragment satisfies a threshold performance metric, modifying the digital content fragment from a first size to a second size.

In one or more embodiments, the series of acts 800 includes an act of identifying a first probability corresponding to modifying the size, identify a second probability corresponding to modifying the ranking, and identify a third probability corresponding to replacing a digital content fragment from the subset of the digital content fragments with another digital content fragment. In at least one embodiment, applying the mutation to the first layout chromosome comprises sampling the mutation based on the first probability, the second probability, and the third probability.

As shown in FIG. 8, the series of acts 800 includes an act 860 of generating a final digital layout. For example, the act 860 can involve generating a final digital layout of the final subset of digital content fragments based on the final ranking of the final subset of the digital content fragments and region importance metrics of regions within the digital layout. In at least one embodiment, the series of acts 800 includes an act of generating a final digital layout of the final subset of digital content fragments by decoding the final subset of digital content fragments into the final digital layout. For example, decoding the final subset of digital content fragments into the final digital layout includes: assigning a weight to each region in the associated digital layout template, wherein the weight corresponds with a region importance metric; for each region in the associated digital layout template in order based on the assigned weights: determining a size associated with the region; identifying, within the final subset of digital content fragments, a highest ranked digital content fragment with a size that corresponds to the size associated with the region; and assigning the identified digital content fragment to the region.

In addition (or in the alternative) to the acts describe above, in some embodiments, the acts 700 and/or 800 include (1) a step for iteratively mutating layout chromosomes based on the performance metrics to generate a final layout chromosome comprising a ranking of a subset of digital content fragments and/or (2) a step for generating a digital layout based on the ranking of the subset of digital content fragments in the layout chromosome and region importance metrics of regions within the digital layout. For instance, the algorithms and acts described in reference to FIG. 3B (e.g., the act 306), and FIG. 4 (e.g., the acts 404-416) can comprise the corresponding acts for a step for iteratively mutating layout chromosomes based on the performance metrics to generate a final layout chromosome comprising a ranking of a subset of digital content fragments. Similarly, the algorithms and acts described in references to FIG. 3B (e.g., the act 308), FIG. 4 (e.g., the act 418), and FIG. 5 can comprise the corresponding acts for a step for generating a digital layout based on the ranking of the subset of digital content fragments in the layout chromosome and region importance metrics of regions within the digital layout.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
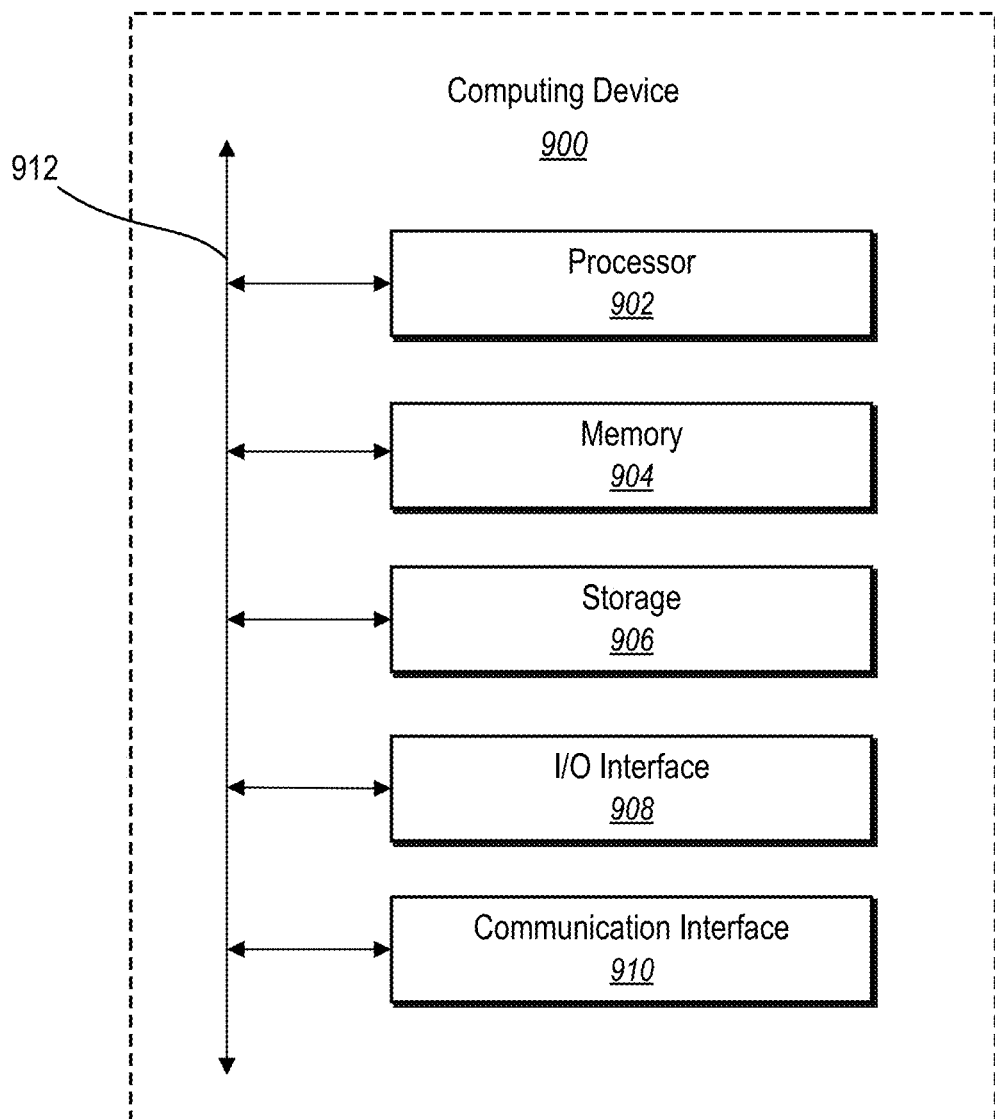
FIG. 9 illustrates a block diagram of an exemplary computing device in accordance with one or more embodiments

FIG. 9 illustrates, in block diagram form, an exemplary computing device 900 that may be configured to perform one or more of the processes described above. One will appreciate that the digital layout design system 102 can be implanted on implementations of the computing device 900. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory. In one or more embodiments, the memory 904 stores or comprises the data storage.

The computing device 900 includes a storage device 906 includes storage for storing data or instructions. As an example, and not by way of limitation, storage device 906 can comprise a non-transitory storage medium described above. The storage device 906 may include a hard disk drive (HDD), flash memory, a Universal Serial Bus (USB) drive or a combination of these or other storage devices. In one or more embodiments, the storage device 906 stores or comprise the data storage.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

We claim:

1. In a digital medium environment for providing digital layouts to client devices across computer networks, a method for generating enhanced digital layouts uniquely tailored to particular audiences, comprising:

identifying digital content fragments, performance metrics associated with the digital content fragments, and a distribution audience;

generate, based on the performance metrics associated with the digital content fragments, a first layout chromosome comprising a ranked subset of the digital content fragments;

determine a first fitness level associated with the first layout chromosome based on the performance metrics of the ranked subset of the digital content fragments and a relevance metric of the ranked subset of the digital content fragments in relation to the distribution audience;

generate a second layout chromosome by applying a mutation to the first layout chromosome, wherein applying the mutation to the first layout chromosome comprises:

identifying a first probability corresponding to modifying a size, identifying a second probability corresponding to modifying a ranking of the ranked subset, and identifying a third probability corresponding to replacing a digital content fragment from the ranked subset of the digital content fragments with another digital content fragment; and applying the mutation to the first layout chromosome by sampling the mutation based on the first probability, the second probability, and the third probability; and based on comparing a second fitness level associated with the second layout chromosome to the first fitness level of the first layout chromosome, generate a final digital layout, utilizing the second layout chromosome, to provide to the client devices of the distribution audience.

2. The method as recited in claim 1, wherein the layout chromosomes comprise a first layout chromosome that includes a first subset of digital content fragments having a first ranking, the first subset of digital content fragments being different than a final subset of digital content fragments.

3. The method as recited in claim 2, wherein the first layout chromosome corresponds to a first fitness level based on a first set of performance metrics from the performance metrics corresponding to the first subset of digital content fragments and a final layout chromosome corresponds to a final fitness level based on a final set of performance metrics from the performance metrics corresponding to the final subset of digital content fragments.

4. The method as recited in claim 3, wherein the final fitness level exceeds the first fitness level and further comprising providing the final digital layout to a client device corresponding to the distribution audience.

5. The method as recited in claim 3, wherein the final fitness level of the final layout chromosome is further based on a relevance metric of the final subset of digital content fragments relative to the distribution audience and a diversity metric of content of the final subset of the digital content fragments.

6. A non-transitory computer-readable storage medium storing instructions thereon that, when executed by at least one processor, cause a system to:

identify digital content fragments, performance metrics associated with the digital content fragments, and a distribution audience;

generate, based on the performance metrics associated with the digital content fragments, a first layout chromosome comprising a ranked subset of the digital content fragments;

determine a first fitness level associated with the first layout chromosome based on the performance metrics of the ranked subset of the digital content fragments and a relevance metric of the ranked subset of the digital content fragments in relation to the distribution audience;

generate a second layout chromosome by applying a mutation to the first layout chromosome, wherein applying the mutation to the first layout chromosome comprises:

identifying a first probability corresponding to modifying a size, identifying a second probability corresponding to modifying a ranking of the ranked subset, and identifying a third probability corresponding to replacing a digital content fragment from the ranked subset of the digital content fragments with another digital content fragment; and applying the mutation to the first layout chromosome by sampling the mutation based on the first probability, the second probability, and the third probability; and based on comparing a second fitness level associated with the second layout chromosome to the first fitness level of the first layout chromosome, generate a final digital layout, utilizing the second layout chromosome, to provide to client devices of the distribution audience.

7. The non-transitory computer-readable storage medium as recited in claim 6, further comprising instructions that, when executed by the at least one processor, cause the system to generate the first layout chromosome by:

ranking a subset of the digital content fragments in the first layout chromosome based on the identified performance metrics; and selecting a number of digital content fragments in an order based on the ranking, wherein the selected number corresponds to a number of regions in an associated digital layout template, wherein each region in the associated digital layout template comprises a size and position.

8. The non-transitory computer-readable storage medium as recited in claim 7, further comprising instructions that, when executed by the at least one processor, cause the system to determine the first fitness level associated with the first layout chromosome by:

determining, based on the performance metrics of the ranked subset of the digital content fragments in the first layout chromosome and the associated digital layout template, a contribution metric associated with the digital content fragments decoded from the first layout chromosome into a first digital layout;

determining a diversity metric associated with the ranked subset of the digital content fragments in the first layout chromosome; and determining the first fitness level based on the contribution metric, the relevance metric, and the diversity metric.

9. The non-transitory computer-readable storage medium as recited in claim 8, wherein determining the contribution metric associated with the digital content fragments decoded from the first layout chromosome into the first digital layout comprises:

for each digital content fragment in the first digital layout:
determining a region importance metric associated with a position of the digital content fragment in the first digital layout, and weighting the performance metric associated with the digital content fragment based on the determined region importance metric; and determining the contribution metric based on the weighted performance metrics associated with the digital content fragments in the first digital layout.

10. The non-transitory computer-readable storage medium as recited in claim 9, wherein determining the relevance metric associated with the ranked subset of the digital content fragments in the first layout chromosome in relation to the distribution audience comprises:

for each digital content fragment in the first layout chromosome:
determining an individual relevance metric for the digital content fragment based on at least one of: an association between the digital content fragment and the distribution audience or an association between the digital content fragment and one or more topics associated with the associated digital layout template; and determining the relevance metric based on the determined individual relevance metrics for the digital content fragments in the first layout chromosome.

11. The non-transitory computer-readable storage medium as recited in claim 10, wherein determining a diversity metric associated with the ranked subset of the digital content fragments in the first layout chromosome comprises:
  identifying attributes represented by the identified digital content fragments, wherein the attributes represented by the identified digital content fragments comprise a topic and a content type;
  determining a coverage metric reflecting combined importance of the attributes represented by the identified digital content fragments in the first layout chromosome;
  determining a balance metric reflecting distribution of the attributes of the identified digital content fragments within the ranked subset of the digital content fragments in the first layout chromosome; and
  determining the diversity metric based on the coverage metric and the balance metric.

12. The non-transitory computer-readable storage medium as recited in claim 11, further comprising instructions that, when executed by at least one processor, cause the system to apply a mutation to the first layout chromosome by selectively performing one of:
  varying a size of a digital content fragment in the first layout chromosome;
  exchanging a position of a first digital content fragment with a position of a second digital content fragment within the first layout chromosome; or
  replacing a digital content fragment in the first layout chromosome with a digital content fragment from the identified digital content fragments not currently in the first layout chromosome.

13. The non-transitory computer-readable storage medium as recited in claim 12, further comprising instructions that, when executed by the at least one processor, cause the system to determine the second fitness level associated with the second layout chromosome by:
  decoding, based on the associated digital layout template, the digital content fragments from the second layout chromosome into a second digital layout; and
  determining a fitness score associated with the second digital layout based on a contribution metric associated with the second digital layout, a relevance metric associated with the digital content fragments in the second layout chromosome, and a diversity metric associated with the digital content fragments in the second layout chromosome.

14. The non-transitory computer-readable storage medium as recited in claim 13, wherein:
  the identified digital content fragments comprise at least one of a digital image, a digital video, or digital text; and
  the identified performance metrics comprise at least one of conversions, revenue, click-throughs, or downloads.

15. A system comprising:
  a non-transitory computer memory; and
  at least one computing device storing instructions thereon that, when executed by at least one processor, cause the system to:
    identify digital content fragments, performance metrics associated with the digital content fragments, and a distribution audience;
    generate, based on iteratively modifying a plurality of layout chromosomes, a final layout chromosome having a final ranking of a final subset of digital content fragments by:
      generating a first layout chromosome comprising a first ranking of a subset of the digital content fragments;
      determining a fitness level of the first layout chromosome based on the performance metrics of the subset of the digital content fragments, a relevance metric of the subset of the digital content fragments, and a diversity metric of content of the subset of the digital content fragments; and
      generating a second layout chromosome by applying a mutation to the first layout chromosome, wherein applying the mutation to the first layout chromosome comprises:
        identifying a first probability corresponding to modifying a size, identifying a second probability corresponding to modifying the ranking, and identifying a third probability corresponding to replacing a digital content fragment from the subset of the digital content fragments with another digital content fragment; and
        applying the mutation to the first layout chromosome by sampling the mutation based on the first probability, the second probability, and the third probability; and
    generate a final digital layout of the final subset of digital content fragments based on the final ranking of the final subset of the digital content fragments and region importance metrics of regions within the final digital layout.

16. The system as recited in claim 15, wherein generating the first layout chromosome comprises:
  ranking the subset of the digital content fragments based on the identified performance metrics; and
  selecting a number of digital content fragments in an order based on the ranking, wherein the selected number corresponds to a number of regions in an associated digital layout template, wherein each region in the associated digital layout template comprises a size and position.

17. The system as recited in claim 16, wherein modifying the size of the digital content fragment in the first layout chromosome comprises, based on a determination that a digital content fragment satisfies a threshold performance metric, modifying the digital content fragment from a first size to a second size.

18. The system as recited in claim 17, further storing instructions thereon that, when executed by at least one processor, cause the system to generate a final digital layout of the final subset of digital content fragments by decoding the final subset of digital content fragments into the final digital layout.

19. The system as recited in claim 18, wherein decoding the final subset of digital content fragments into the final digital layout comprises:
  assigning a weight to each region in the associated digital layout template, wherein the weight corresponds with a region importance metric;
  for each region in the associated digital layout template in order based on the assigned weights:
    determining a size associated with the region;
    identifying, within the final subset of digital content fragments, a highest ranked digital content fragment with a size that corresponds to the size associated with the region; and
    assigning the identified digital content fragment to the region.

20. The system as recited in claim 19, wherein sampling the mutation based on the first probability, the second probability, and the third probability comprises selectively performing at least one of:

varying a size of a digital content fragment in the first layout chromosome;

exchanging a position of a first digital content fragment with a position of a second digital content fragment within the first layout chromosome; or replacing a digital content fragment in the first layout chromosome with a digital content fragment from the identified digital content fragments not currently in the first layout chromosome.

* * * * *